United States Patent
Becker

(10) Patent No.: US 11,076,085 B2
(45) Date of Patent: *Jul. 27, 2021

(54) DETECTING INTERFERENCE BETWEEN TIME-OF-FLIGHT CAMERAS USING MODIFIED IMAGE SENSOR ARRAYS

(71) Applicant: Amazon Technologies, Inc., Seattle, WA (US)

(72) Inventor: Gabor Becker, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,103

(22) Filed: Jun. 8, 2020

(65) Prior Publication Data
US 2020/0304720 A1 Sep. 24, 2020

Related U.S. Application Data

(63) Continuation of application No. 16/180,474, filed on Nov. 5, 2018, now Pat. No. 10,708,484, which is a
(Continued)

(51) Int. Cl.
*H04N 5/232* (2006.01)
*B64C 39/02* (2006.01)
*H04N 5/225* (2006.01)

(52) U.S. Cl.
CPC ..... *H04N 5/232061* (2018.08); *B64C 39/024* (2013.01); *H04N 5/2254* (2013.01);
(Continued)

(58) Field of Classification Search
None
See application file for complete search history.

(56) References Cited

U.S. PATENT DOCUMENTS 6,035,717 A 3/2000 Carodiskey
7,225,980 B2 6/2007 Ku et al.
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Janese Duley
(74) *Attorney, Agent, or Firm* — Athorus, PLLC

(57) ABSTRACT

Time-of-flight cameras may be synchronized where the fields of view of the time-of-flight cameras overlap. The time-of-flight cameras may be programmed within intervals of time for illuminating their respective fields of view that do not conflict with one another. When a first time-of-flight camera illuminates a first field of view that overlaps with a second field of view of a second time-of-flight camera, and the second time-of-flight camera detects reflected light from the illumination, the second time-of-flight camera may determine a time to illuminate the second field of view based on the reflected light. A time-of-flight camera may include an image sensor modified to include one or more modulated light sensors among an array of photoreceptors. A modulation frequency or illumination interval may be selected for the time-of-flight camera based on modulation frequencies or illumination intervals of other cameras, as determined based on data captured by the modulated light sensors.

20 Claims, 33 Drawing Sheets

Related U.S. Application Data continuation-in-part of application No. 16/013,760, filed on Jun. 20, 2018, now Pat. No. 10,674,063.

(52) U.S. Cl.
CPC ......... *H04N 5/2256* (2013.01); *H04N 5/2258* (2013.01); *B64C 2201/123* (2013.01); *B64C 2201/127* (2013.01)

(56) References Cited

U.S. PATENT DOCUMENTS

| | | |
|---|---|---|
| 7,362,419 B2 | 4/2008 | Kurihara et al. |
| 7,405,812 B1 | 7/2008 | Bamji |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,103,663 B2 | 8/2015 | Min et al. |
| 9,473,747 B2 | 10/2016 | Kobres et al. |
| 9,894,347 B2 | 2/2018 | Yoon et al. |
| 9,897,698 B2 | 2/2018 | Boufounos et al. |
| 10,165,257 B2 | 12/2018 | Seshadrinathan et al. |
| 10,368,053 B2 | 7/2019 | Bauza et al. |
| 10,473,785 B2 | 11/2019 | Kubota et al. |
| 2003/0002712 A1 | 1/2003 | Steenburgh et al. |
| 2004/0181467 A1 | 9/2004 | Raiyani et al. |
| 2006/0197937 A1 | 9/2006 | Bamji et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0033045 A1 | 2/2012 | Schweizer et al. |
| 2012/0177252 A1 | 7/2012 | Korekado et al. |
| 2012/0284132 A1 | 11/2012 | Kim et al. |
| 2013/0076898 A1 | 3/2013 | Philippe et al. |
| 2013/0148102 A1 | 6/2013 | Oggier |
| 2013/0169756 A1 | 7/2013 | Min et al. |
| 2013/0201288 A1 | 8/2013 | Billerbeck et al. |
| 2013/0253700 A1 | 9/2013 | Carson et al. |
| 2014/0055771 A1 | 2/2014 | Oggier |
| 2014/0152974 A1 | 6/2014 | Ko |
| 2014/0279294 A1 | 9/2014 | Field-Darragh et al. |
| 2014/0313376 A1 | 10/2014 | Nieuwenhove et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2015/0373322 A1 | 12/2015 | Goma et al. |
| 2016/0307325 A1 | 10/2016 | Wang et al. |
| 2016/0309133 A1 | 10/2016 | Laroia et al. |
| 2016/0330391 A1 | 11/2016 | Bulteel et al. |
| 2017/0180658 A1 | 6/2017 | Choi et al. |
| 2017/0180713 A1 | 6/2017 | Trail |
| 2017/0188019 A1 | 6/2017 | Kashyap |
| 2017/0275023 A1 | 9/2017 | Harris et al. |
| 2017/0323455 A1 | 11/2017 | Bittan et al. |
| 2018/0045513 A1 | 2/2018 | Kitamura et al. |
| 2018/0081033 A1 | 3/2018 | Demirtas et al. |
| 2018/0259628 A1 | 9/2018 | Plank et al. |
| 2018/0300891 A1 | 10/2018 | Wang et al. |
| 2018/0302611 A1 | 10/2018 | Baak et al. |
| 2018/0307310 A1 | 10/2018 | McCombe et al. |
| 2018/0348345 A1 | 12/2018 | Haroun et al. |
| 2018/0350087 A1 | 12/2018 | Kowdle et al. |
| 2019/0035099 A1 | 1/2019 | Afrouzi et al. |
| 2019/0049962 A1 | 2/2019 | Ouellette et al. |
| 2019/0105514 A1 | 4/2019 | Amstutz et al. |
| 2019/0109977 A1 | 4/2019 | Dutton et al. |
| 2019/0213895 A1 | 7/2019 | Omani et al. |
| 2019/0227174 A1 | 7/2019 | Hitomi |
| 2019/0317217 A1 | 10/2019 | Day et al. |
| 2020/0077078 A1 | 3/2020 | Denenberg et al. |
| 2020/0090417 A1 | 3/2020 | Schloter |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Drown, Dan, "PPS over USB," Jul. 12, 2017, URL: http://blog.dan.drown.org/pps-over-usb/, downloaded on Jun. 20, 2018, 12 pages.

International Search Report and Written Opinion for PCT/US2019/036803, dated Sep. 19, 2019, 11 pages.

Gokturk, S. B. et al. A Time-Of-Flight Depth Sensor-System Description, 2004, (Year: 2004), 9 pages.

Li, Larry, "Time-of-Flight Camera—An Introduction," Technical White Paper, No. SLOA190B—Jan. 2014 (rev. May 2014), Copyright 2014, Texas Instruments, Inc., 10 pages.

Moller, Tobias et al., "Robust 3D Measurement with PMD Sensors," Proceedings of the 1st Range Imaging Research Day at ETH, Zurich, Switzerland (2005), 14 pages.

Perenzoni, M. and Stoppa, D., Figures of Merit for Indirect Time-of-Flight 3D Cameras: Definition and Experimental Evaluation, Remote Sensing, 2011, 3, 2461-2472; doi:10.3390/rs3112461, 12 pages.

Van Nieuwenhove, D., et al., Time-of-Flight Optical Ranging Sensor Based on a Current Assisted Photonic Demodulator, Proceedings Symposium IEEE/Leos Benelux Chapter, 2006, Eindhoven, 4 pages.

Wikipedia, "Bracketing," URL: https://en.wikipedia.org/wiki/Bracketing (printed Jun. 27, 2018), 3 pages.

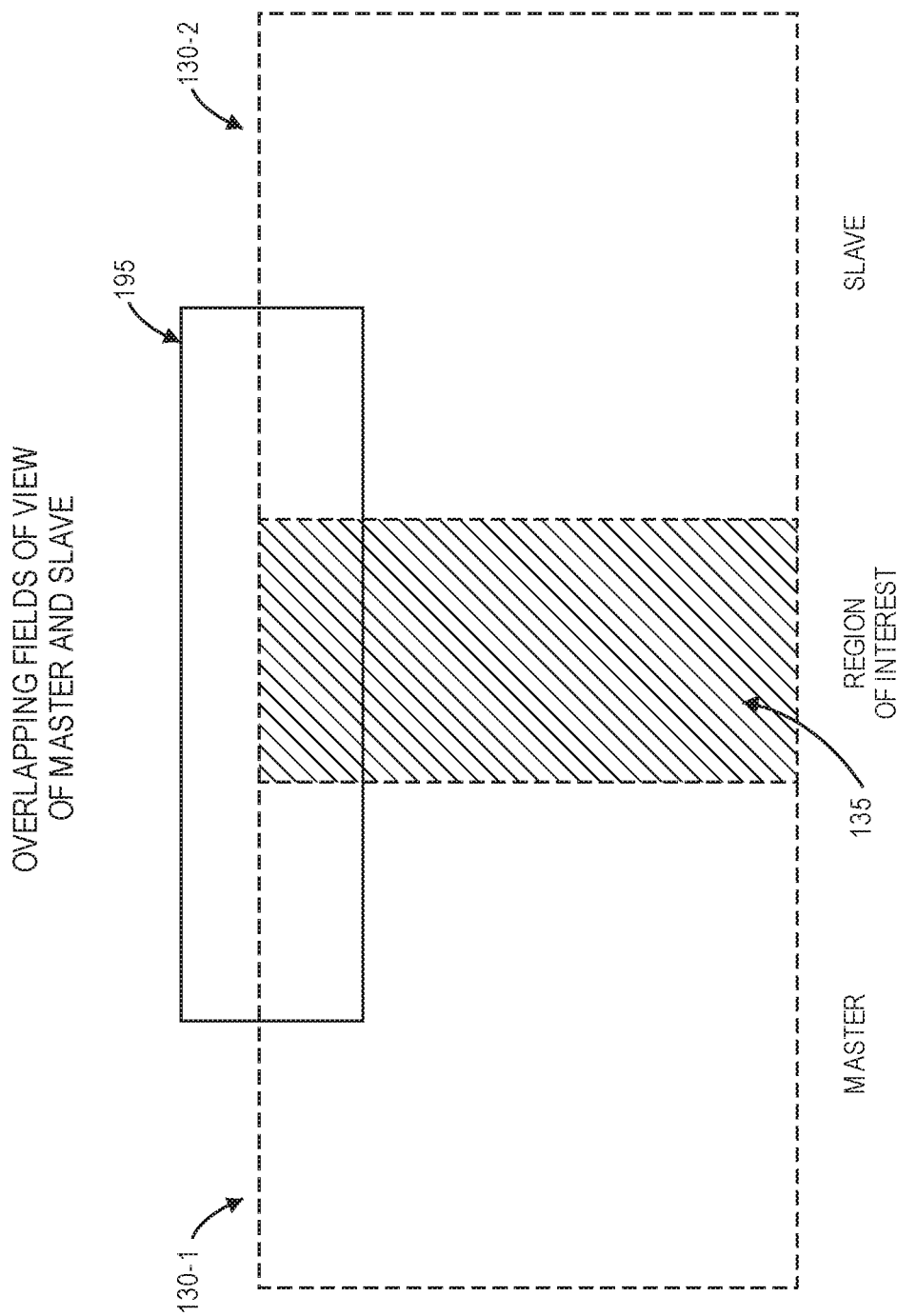

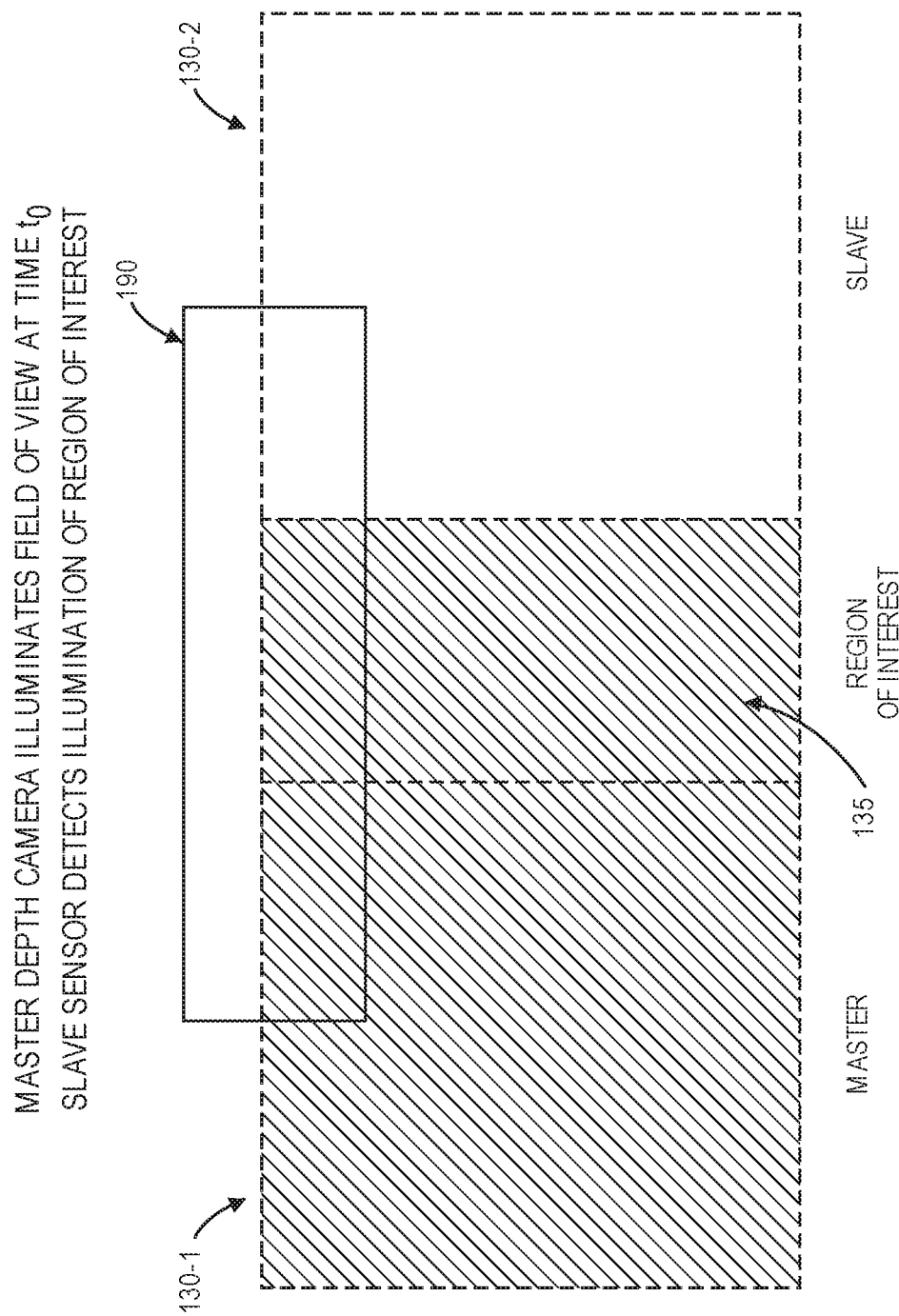

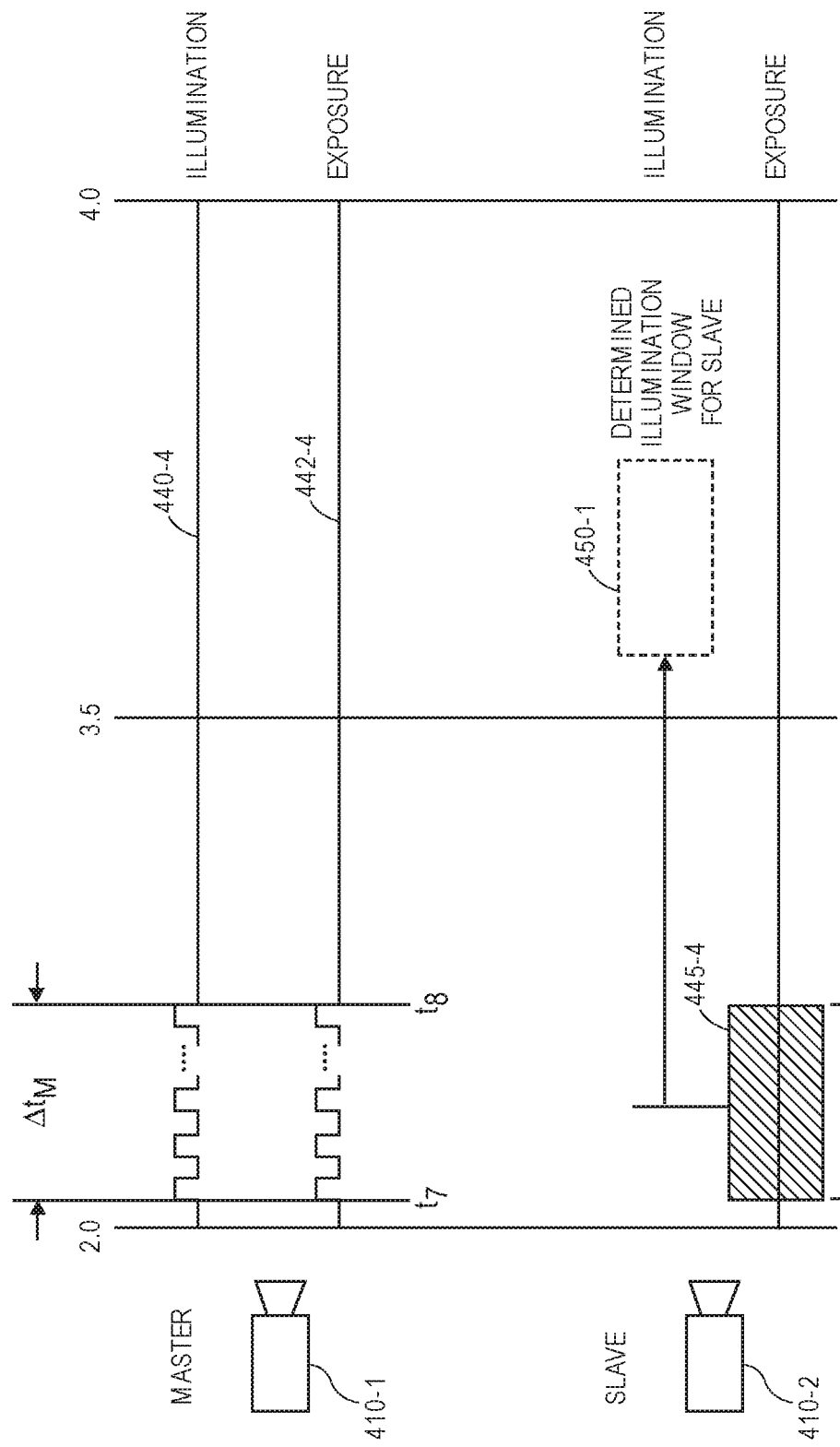

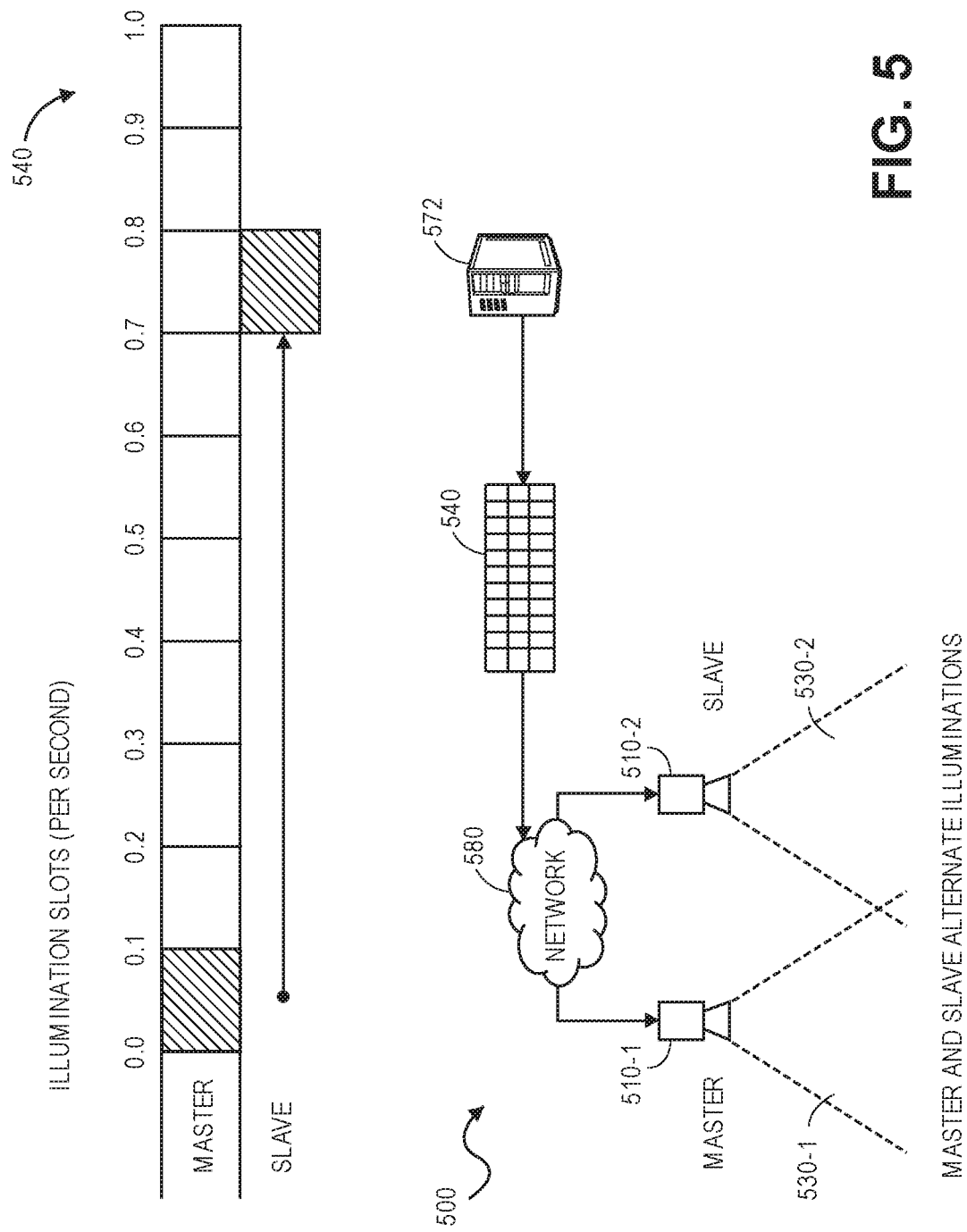

DEPTH INTERFERENCE DETECTED USING MODIFIED IMAGE SENSOR ARRAY

DETECTING INTERFERENCE BETWEEN TIME-OF-FLIGHT CAMERAS USING MODIFIED IMAGE SENSOR ARRAYS

CROSS-REFERENCE TO RELATED APPLICATIONS

This application is a continuation of U.S. patent application Ser. No. 16/180,474, filed Nov. 5, 2018, which is a continuation-in-part of U.S. patent application Ser. No. 16/013,760, now U.S. Pat. No. 10,674,063, filed Jun. 20, 2018. The contents of each of these applications are incorporated by reference herein in their entireties.

BACKGROUND

A "time-of-flight" camera is a depth-sensing or range-sensing system that operates by illuminating a scene using a light source (e.g., a modulated source of light at any wavelength or frequency, such as infrared) and capturing light that is reflected from various points of the scene following the illumination. Time-of-flight cameras are typically equipped with an illuminator for illuminating a scene, and a sensor for capturing reflected light from the scene. The reflected light that is captured by a time-of-flight camera sensor may be interpreted to generate a depth profile of portions of the scene within a field of view of the time-of-flight camera. Some time-of-flight cameras may capture and interpret reflected light, and generate depth images or profiles of portions of scenes from such reflected light, several dozen times per second. Depth images or profiles generated by time-of-flight cameras can be very accurate.

Occasionally, where two or more time-of-flight cameras are mounted at scenes with overlapping fields of view, care must be taken when operating the time-of-flight cameras. Where an illuminator of a first time-of-flight camera illuminates a scene, and a sensor of a second time-of-flight camera having an overlapping field of view is exposed, reflections of the light projected onto the scene from the illuminator of the first time-of-flight camera may be detected by the sensor of the second time-of-flight camera, thereby resulting in a false construction of a depth profile by the second time-of-flight camera. To alleviate this effect, the operation of multiple time-of-flight cameras may be synchronized. Where two or more time-of-flight cameras are mounted with overlapping fields of view, the times at which such cameras operate illuminators to illuminate scenes and expose sensors to capture reflected light from such scenes may be sequenced (or staggered) to ensure that a sensor of a time-of-flight camera is exposed only at times when an illuminator of that time-of-flight camera has illuminated a scene, and not at other times, e.g., when an illuminator of another time-of-flight camera has illuminated the scene.

Synchronizing the operation of multiple time-of-flight cameras having overlapping fields of view may be performed where the time-of-flight cameras operate under the control of, and are in communication with, a common computer device. In such environments, the time-of-flight cameras may be operated according to a network timing protocol that controls the illumination of a scene by an illuminator and the capture of reflected light by the exposure of a sensor for each of the time-of-flight cameras. Synchronizing the operation of multiple time-of-flight cameras is not presently feasible, however, where the time-of-flight cameras are not connected to a common computer device, or otherwise may not be operated according to a network timing protocol. Such environments may include, for example, scenes having a large number of time-of-flight cameras mounted with overlapping fields of view, or where time-of-flight cameras are mounted aboard independently operated machines such as autonomous mobile robots or unmanned aerial vehicles, such that fields of view of such cameras overlap for brief or unpredictable periods of time.

BRIEF DESCRIPTION OF THE DRAWINGS

FIGS. 1A through 1F are views of aspects of one system for synchronizing time-of-flight cameras in accordance with embodiments of the present disclosure.

FIGS. 4A through 4E are views of aspects of one system for synchronizing time-of-flight cameras in accordance with embodiments of the present disclosure.

FIG. 5 is a view of aspects of one system for synchronizing time-of-flight cameras in accordance with embodiments of the present disclosure.

DETAILED DESCRIPTION

Figure 1A:
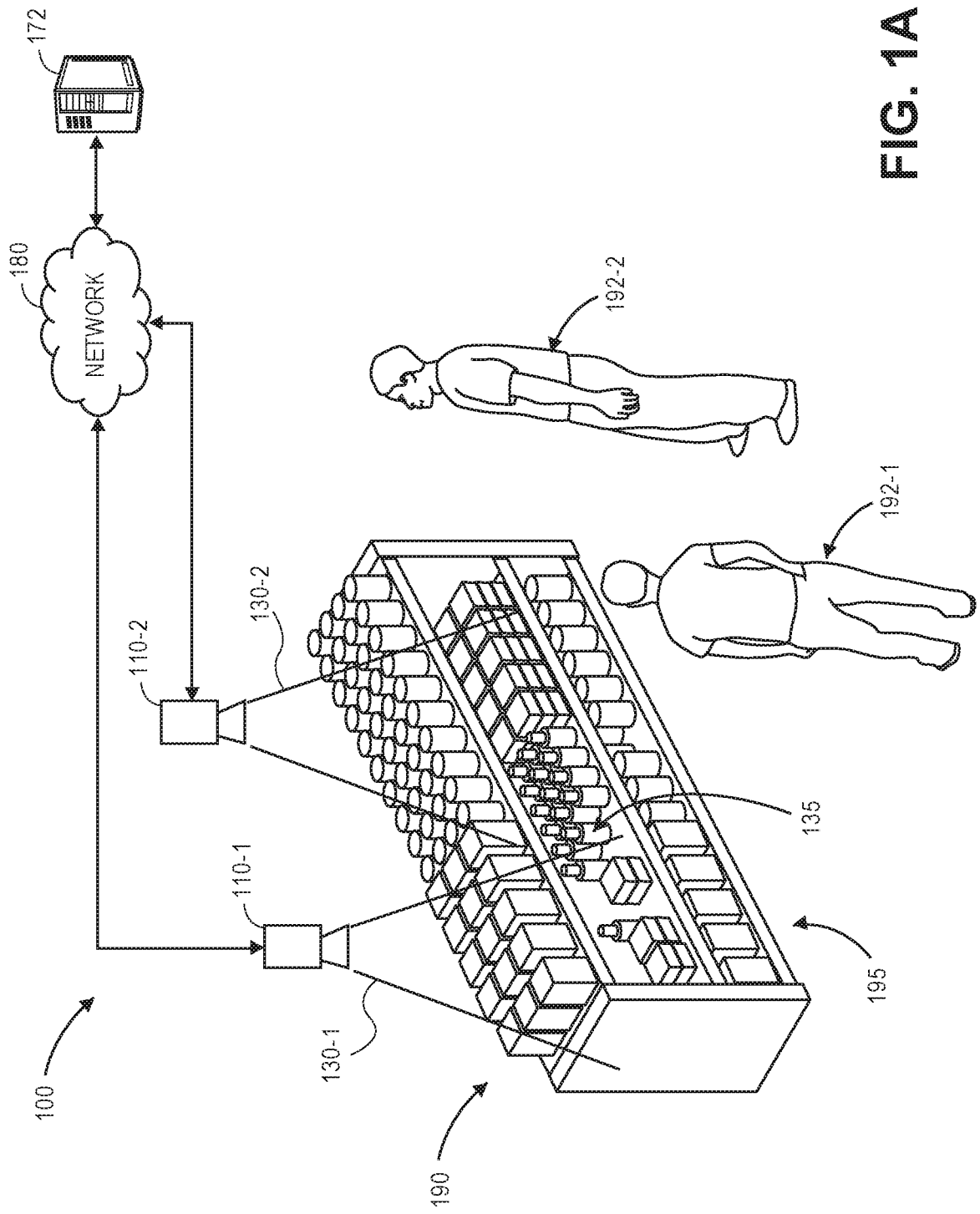

As is set forth in greater detail below, the present disclosure is directed to synchronizing time-of-flight cameras. More specifically, the systems and methods disclosed herein are directed to synchronizing the operation of two or more time-of-flight cameras having overlapping fields of view. Each of the cameras may be programmed with a designation as a "master" camera to one or more other cameras, or a "slave" to a given master camera. Each of the cameras (e.g., masters and slaves) may also be programmed with a predetermined illumination interval and a predetermined exposure interval within a repeating unit of time. Additionally, a slave camera may also be programmed to selectively expose a portion of a sensor corresponding to a field of view that overlaps with a field of view of a master camera. When a master camera illuminates a scene and exposes its sensor in accordance with the predetermined illumination interval and the predetermined exposure interval, a slave camera may expose a portion of its sensor corresponding to the overlapping fields of view. Upon detecting the illumination of the overlapping portion at a specific time, the slave camera may select its predetermined illumination interval with respect to the predetermined illumination interval of the master camera. The master camera and the slave camera may then illuminate their respective fields of view in an alternating fashion, or in any other manner that does not conflict with one another.

A time-of-flight camera may be outfitted with an image sensor array that has been modified to include a plurality of modulated light sensors having one or more photodiodes, lenses or other structures and may be installed or provided in place of one or more pixel sensors. The modulated light sensors may be specifically installed and configured to map a field of view of the time-of-flight camera, e.g., by one or more lenses or lens assemblies, which cause an area of sensitivity to the modulated light sensor or one or more photodiodes therein to map to the field of view of the time-of-flight camera. The modulated light sensors of the image sensor array may be configured to detect modulated signals and frequencies of light, or times at which modulated light is present within the field of view of the time-of-flight camera, in order to determine when depth interference is present from one or more other time-of-flight cameras having fields of view that overlap with the time-of-flight camera. For example, each of the modulated light sensors may be coupled to a transimpedance amplifier circuit, or other amplifier circuit, e.g., a bandpass filter circuit, to distinguish modulated light projected by illuminators of one or more other time-of-flight cameras from other light that may be present within the field of view of the time-of-flight camera. Information or data regarding modulated light detected using one or more of the modulated light sensors in a modified sensor array may be processed to identify a time-of-flight camera or system (e.g., a vehicle) associated with the time-of-flight camera that is responsible for the depth interference, and times at which the modulated light is detected, e.g., on a repeated or standalone basis. Thereafter, relative times or slots within a repeated interval at which the time-of-flight camera may illuminate a field of view and expose the modified image sensor array without risk of depth interference may be determined.

Referring to FIGS. 1A through 1F, views of aspects of one system 100 for synchronizing time-of-flight cameras in accordance with the present disclosure are shown. As is shown in FIG. 1A, the system 100 includes a pair of time-of-flight cameras 110-1, 110-2 and a server 172 that are connected to one another over a network 180, which may include the Internet in whole or in part. One of the time-of-flight cameras 110-1, 110-2 (viz., the time-of-flight camera 110-1) may be designated a "master" time-of-flight camera, while another of the time-of-flight cameras 110-1, 110-2 (viz., the time-of-flight camera 110-2) may be designated a "slave" time-of-flight camera.

The time-of-flight camera 110-1 and the time-of-flight camera 110-2 each have respective fields of view 130-1, 130-2 that include at least a portion of a working environment including a storage unit 190 having a plurality of items 195 stored thereon therein. The time-of-flight camera 110-1 and the time-of-flight camera 110-2 each include illuminators for illuminating their respective fields of view 130-1, 130-2 with modulated infrared light pulses, and sensors for capturing and interpreting light reflected from the storage unit 190, the items 195 and/or a pair of actors 192-1, 192-2.

As is shown in FIG. 1B, the fields of view 130-1, 130-2 of the time-of-flight cameras 110-1, 110-2 overlap in a region of interest 135. Each of the fields of view 130-1, 130-2 of the time-of-flight cameras 110-1, 110-2 and the region of interest 135 includes at least a portion of the storage unit 190. Although the fields of view 130-1, 130-2 are shown in FIG. 1B as having image planes in the shapes of co-aligned rectangles, and the region of interest 135 is also shown in FIG. 1B as having a shape of a rectangle, and with at least one dimension in common with each of the fields of view 130-1, 130-2, the region of interest 135 and the fields of view 130-1, 130-2 may take any shape and have any size in accordance with the present disclosure.

Figure 1C:
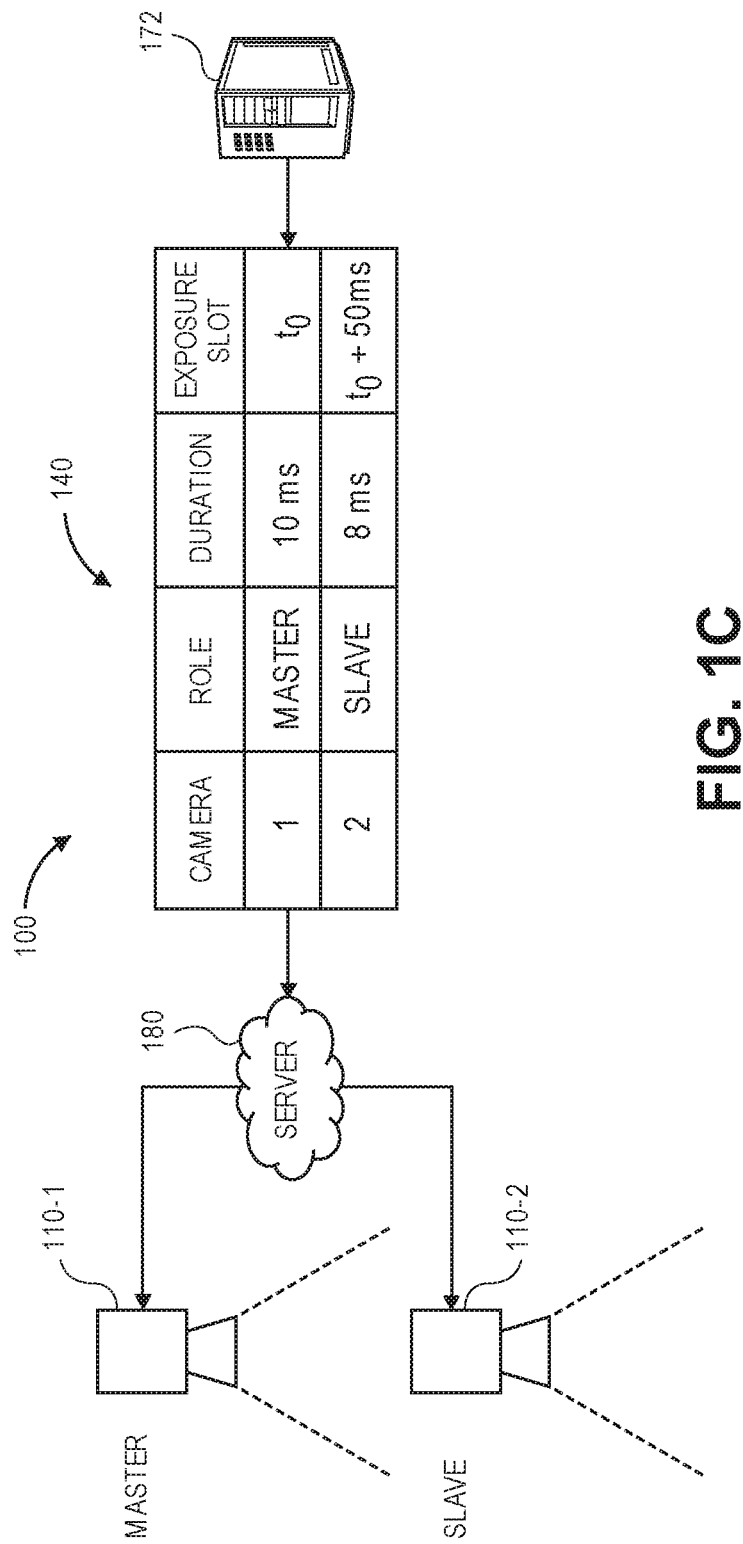

As is shown in FIG. 1C, the time-of-flight cameras 110-1, 110-2 may be programmed to illuminate their respective fields of view 130-1, 130-2 at select illumination intervals. The server 172 transmits a data record 140 (or other set of instructions) including identifiers of the roles to be performed by the time-of-flight cameras 110-1, 110-2 (viz., "Master" and "Slave"), as well as illumination durations, and slots of a repeated interval (or frame time) by which sensors of the time-of-flight cameras 110-1, 110-2 are to be exposed. The repeated interval may have any duration, e.g., one second, ten seconds, one minute, ten minutes, one hour, or the like. As is shown in FIG. 1C, the data record 140 contemplates exposing the sensor of the time-of-flight camera 110-1 at a time to within a repeated interval, and exposing the sensor of the time-of-flight camera 110-2 at fifty milliseconds (50 ms) after the time to within the repeated interval. In some embodiments, the data record 140 may further identify a power level or a modulation frequency at which each of the time-of-flight cameras 110-1, 110-2 is to illuminate the scene for the durations and within the exposure slots, or a wavelength or frequency of light by which the time-of-flight cameras 110-1, 110-2 are to illuminate the scene.

Figure 1D:
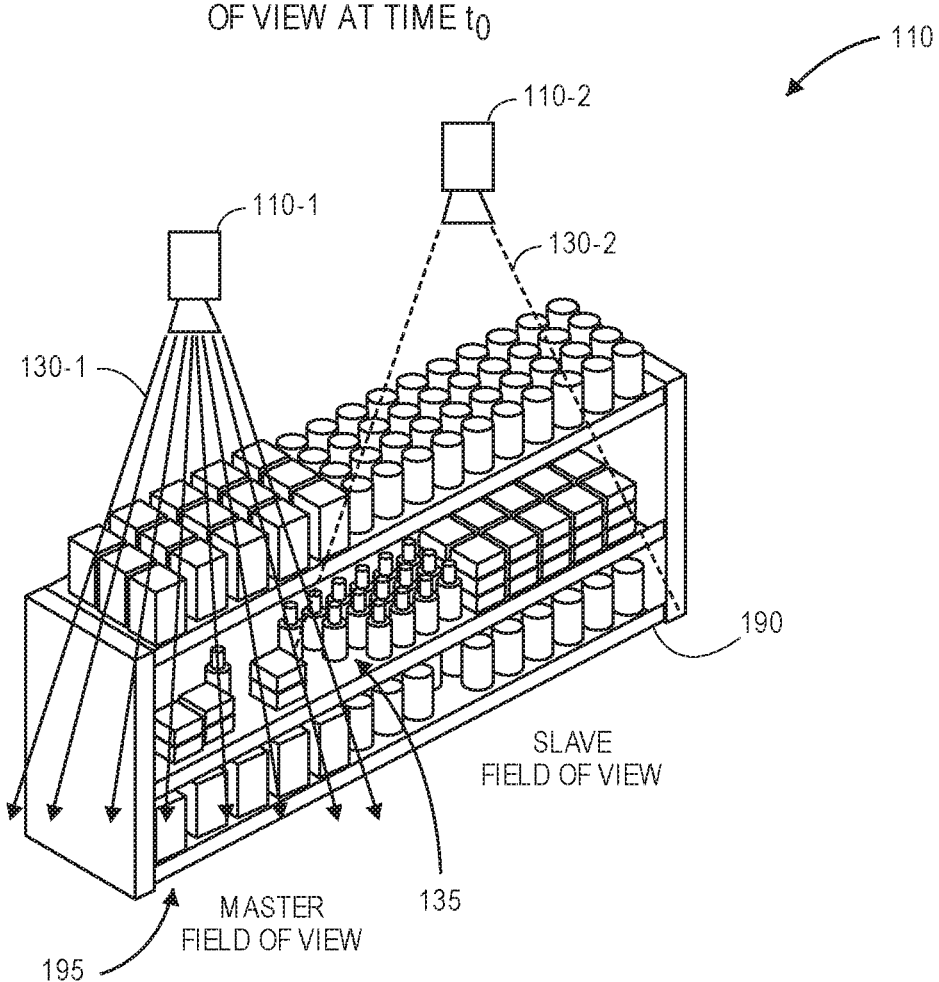

Thus, as is shown in FIG. 1D, the time-of-flight camera 110-1 illuminates the field of view 130-1 at a time to within a repeated interval. As is noted above, and as is shown in FIG. 1E, the illumination of the field of view 130-1 also illuminates the region of interest 135, which is also within the field of view 130-2 of the time-of-flight camera 110-2. In response to the illumination of the field of view 130-1, a sensor on the time-of-flight camera 110-1 may capture light reflected from the shelving unit 190 and/or the one or more items 195 thereon, and construct a depth image or profile of the working environment accordingly. Additionally, a sensor on the time-of-flight camera 110-2 may determine whether any of the photoreceptors or photosensitive components of the sensor (e.g., pixels) corresponding to the region of interest 135 is exposed at the time to.

Figure 1F:
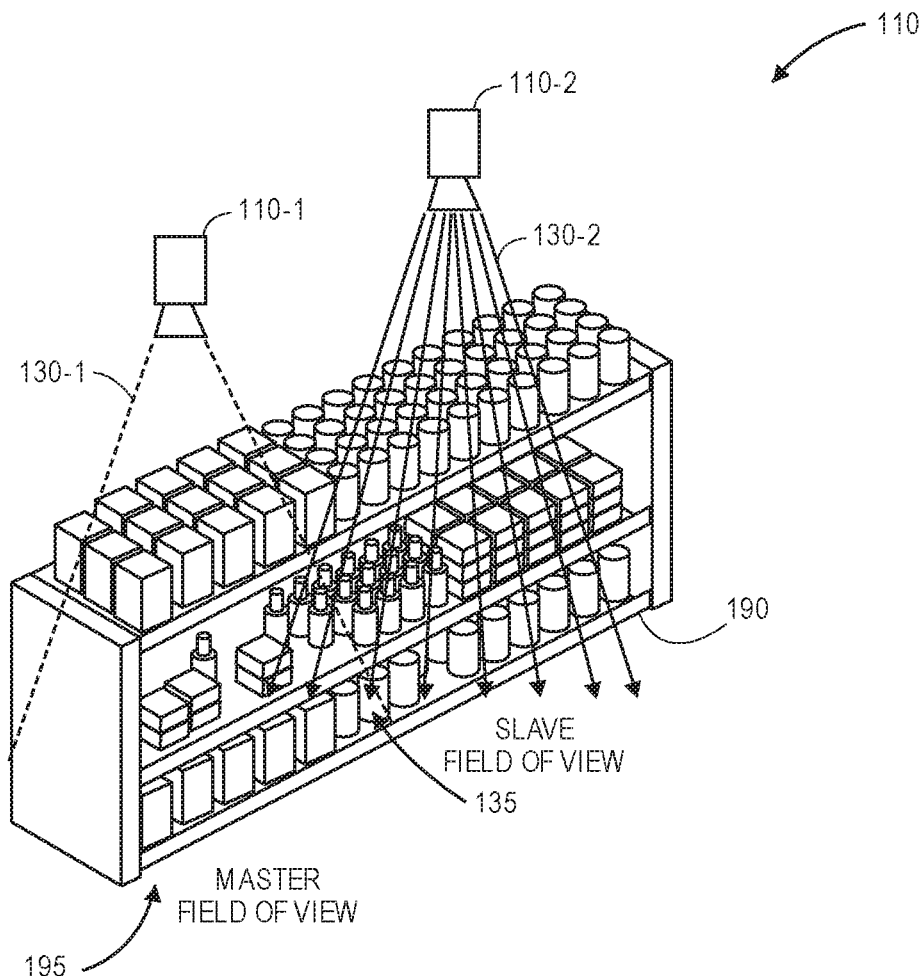

As is shown in FIG. 1F, and in response to determining that the region of interest 135 was illuminated by the time-of-flight camera 110-1 at the time to, the time-of-flight camera 110-2 may illuminate the field of view 130-2 fifty milliseconds (or 50 ms) later. In response to the illumination of the field of view 130-1, for example, a sensor on the time-of-flight camera 110-1 may capture light reflected from the shelving unit 190 and/or the one or more items 195 thereon, and construct a depth image or profile of the working environment from the perspective of the time-of-flight camera 110-2.

Accordingly, the systems and methods of the present disclosure may be used to synchronize two or more imaging devices having overlapping fields of view to capture depth imaging data from a scene. The imaging devices may be specifically programmed with respective designations as a master or as a slave, and times or intervals at which the imaging devices are scheduled to illuminate a scene and/or expose a sensor to capture light reflected from the scene, in order to thereby multiplex the operations of the respective imaging devices for capturing depth imaging data from the scene based on time. The time-of-flight cameras may be programmed within intervals of time for illuminating their respective fields of view that do not conflict with one another. When a first time-of-flight camera illuminates a first field of view that overlaps with a second field of view of a second time-of-flight camera, and the second time-of-flight camera detects reflected light from the illumination, the second time-of-flight camera may determine a time to illuminate the second field of view based on the reflected light. In this manner, any number of time-of-flight cameras may be synchronized with one another without requiring a direct connection between the time-of-flight cameras. Alternatively, or additionally, the operations of the respective imaging devices for capturing depth imaging data from the scene may be multiplexed based on illumination power levels, modulation frequencies, or illumination wavelengths or frequencies in accordance with the present disclosure.

The systems and methods of the present disclosure may further include image sensors, e.g., image sensor arrays, that have been modified to include one or more specialized modulated light sensors installed in place of one or more pixel sensors thereon. The modulated light sensors may include one or more lenses or lens assemblies for mapping the sensors to a field of view of the image sensor, and may be configured to detect modulated signals and frequencies of light, or times at which modulated light is detected, in order to determine when depth interference is present from one or more other time-of-flight cameras having fields of view that overlap with the time-of-flight camera. In some embodiments, each of the modulated light sensors may be coupled to a transimpedance amplifier circuit, or other amplifier circuit, e.g., a bandpass filter circuit, to distinguish modulated light projected by illuminators of one or more other time-of-flight cameras from other light that may be present within the field of view of the time-of-flight camera. Information or data regarding modulated light detected using one or more of the specialized sensors may be processed to identify a time-of-flight camera, a vehicle or another system that is responsible for the depth interference, the times at which the modulated light is detected, and a modulation frequency of the modulated light from the interfering system. Relative times or slots within a repeated interval at which the time-of-flight camera may illuminate a field of view and expose the modified image sensor array without risk of depth interference may be determined accordingly.

A time-of-flight camera is an imaging device having an illuminator and a sensor that determines distances to each of a plurality of pixels corresponding to a portion of a scene within a field of view by illuminating the scene by the illuminator, e.g., a modulated light source, and capturing the reflected light by the sensor. The illuminator typically emits light (e.g., infrared or near-infrared light having a wavelength between seven hundred and one thousand nanometers, or 700-1000 nm) by way of a laser, a light-emitting diode (or "LED"), or another light source. The sensor may include an array of photodetectors or photosensitive components such as a charge coupled device ("CCD"), a complementary metal-oxide sensor ("CMOS"), photodiodes, or the like. The sensor may capture light reflected from objects on the scene and assign one or more quantitative values (e.g., distances or ranges to such objects) to aspects of the reflected light. In some embodiments, the time-of-flight camera may be a discrete, standalone unit. In some other embodiments, the time-of-flight camera may be integrally or functionally joined with a visual camera, e.g., a color camera (or RGB camera), a grayscale camera or a black-and-white camera.

In some embodiments, a time-of-flight camera operates by illuminating a scene and determining a time required for light to travel from the illuminator to an individual photodetector of the sensor. A distance from the time-of-flight camera to each of the respective portions of a scene corresponding to one of the photodetectors may be determined as a function of the speed of light, or approximately 300 million meters per second (or $3.0 \times 10^8$ m/s). Because a time-of-flight camera may illuminate an entire field of view simultaneously, a time-of-flight camera may be used to generate depth images or profiles of the field of view quickly and efficiently from each illumination.

A time-of-flight camera may operate to illuminate a scene, or to capture light reflected from the scene, in any number of ways. For example, an illuminator of a time-of-flight camera may operate using one or more pulsed light sources. Pulsed modulation may be achieved by integrating photo-electrons from reflected light, or by counting light contact at a first detection of a reflection, e.g., by a single photon avalanche diode, or another type of sensor having any number of photoreceptors thereon. Electrical charges may be accumulated and measured by each of the photoreceptors, for each of the pulses, during windows that are in-phase and/or out-of-phase with the illumination. The measured electrical charges may be used to calculate distances to portions of the scene appearing within the field of view that correspond to such photoreceptors accordingly.

In some embodiments, where a time-of-flight camera operates using a pulsed light source as an illuminator, each pulse may have a high period on the order of several nanoseconds. The pulsing may occur for various distinct periods of time, such as where pulses (on the order of thousands or tens of thousands) of pulse cycles occur for one period, and cease for another period, e.g., a pulse envelope. A time slot may be defined by a predetermined number of pulse envelopes, and any number of time slots may define a repeated interval (or frame time). For example, where an illuminator is programmed to emit pulses for four hundred microseconds (400 μs), or four-tenths of one microsecond (0.400 ms), and to cease pulsing for eight hundred microseconds (800 μs), or eight-tenths of one microsecond (0.800 ms), the pulse envelope may have a duration of twelve hundred microseconds (1200 μs), or 1.2 microseconds (1.2 ms). A time slot may be defined by a predetermined number of the pulse envelopes, e.g., ten, or 12 microseconds (12 ms). Where a plurality of cameras, e.g., eight, are operated in a network, each of the cameras may operate within one of the time slots, and the repeated interval may have a duration defined by the number of time slots, such as eight 12 microsecond slots, or ninety-six microseconds (96 ms). Those of ordinary skill in the pertinent arts will realize that pulses may be emitted or ceased for any durations, and that pulse envelopes, time slots and repeated intervals may likewise have any durations. Additionally, any number of frames may likewise be captured at the repeated intervals, and for any durations.

Alternatively, or additionally, an illuminator of a time-of-flight camera may operate using a number of samples at different phases with respect to the illumination. For example, a time-of-flight camera may capture four samples, e.g., at four phases, each phase-stepped by ninety degrees (viz., zero, ninety, one hundred eighty or two hundred seventy degrees). The scene may be illuminated at different modulation frequencies, thereby increasing a level of accuracy of depth images captured by the time-of-flight camera, or distances embodied in such depth images, accordingly. For example, a phase-shift of a signal, a signal strength and/or an offset (or a gray-scale value) may be calculated for each of the photoreceptors of a sensor, or pixels of a depth image, as a function of the electrical charge accumulated in each of the samples. A distance associated with each of the photoreceptors of the sensor, or pixels of the depth image (e.g., voxels) may be calculated as a function of the speed of light, the phase-shift and the modulation frequency. In some embodiments, a time-of-flight camera may operate at a pair of modulation frequencies, and may capture four sets of sensor data at each of the modulation frequencies, for a total of eight sets of sensor data.

Reflected light may be captured or detected by a time-of-flight camera if the reflected light is within the time-of-flight camera's field of view, which is defined as a function of a lens aperture, a sensor size, and a distance between a sensor and a lens within the time-of-flight camera, viz., a focal length, as well as a location of the time-of-flight camera and an angular orientation of the time-of-flight camera's lens. Accordingly, where an object appears within a depth of field, or a distance within the field of view where the clarity and focus is sufficiently sharp, a time-of-flight camera may capture light that is reflected off objects of any kind to a sufficiently high degree of resolution using one or more sensors thereof, and store information regarding the reflected light in one or more data files.

Many time-of-flight cameras also include manual or automatic features for modifying their respective fields of view or orientations. For example, a time-of-flight camera may be configured in a fixed position, or with a fixed focal length (e.g., fixed-focus lenses) or angular orientation. Alternatively, a time-of-flight camera may include one or more actuated or motorized features for adjusting a position of the time-of-flight camera, or for adjusting either the focal length (e.g., zooming the imaging device) or the angular orientation (e.g., the roll angle, the pitch angle or the yaw angle) of the time-of-flight camera, by causing a change in a distance between the sensor and the lens (e.g., optical zoom lenses or digital zoom lenses), a change in a location of the time-of-flight camera, or a change in one or more of the angles defining an angular orientation.

For example, a time-of-flight camera may be hard-mounted to a support or mounting that maintains the time-of-flight camera in a fixed configuration or angle with respect to one, two or three axes. Alternatively, however, a time-of-flight camera may be provided with one or more motors and/or controllers for manually or automatically operating one or more of the components, or for reorienting the axis or direction of the time-of-flight camera, i.e., by panning or tilting the time-of-flight camera. Panning a time-of-flight camera may cause a rotation within a horizontal plane or about a vertical axis (e.g., a yaw), while tilting a time-of-flight camera may cause a rotation within a vertical plane or about a horizontal axis (e.g., a pitch). Additionally, a time-of-flight camera may be rolled, or rotated about its axis of rotation, and within a plane that is perpendicular to the axis of rotation and substantially parallel to a field of view of the time-of-flight camera.

The systems and methods of the present disclosure are directed to synchronizing two or more time-of-flight cameras that are mounted in association with a working environment, such as a fulfillment center, a transportation center or a financial institution, or aboard a vehicle such as an autonomous mobile robot or unmanned aerial vehicle, with overlapping fields of view. One of the time-of-flight cameras may be designated as a "master," another of the time-of-flight cameras may be designated as a "slave," and each of the time-of-flight cameras may be programmed with illumination intervals and exposure intervals that are relative to one another. When the slave time-of-flight camera detects an illumination of a region of interest, e.g., a region where the fields of view of the master time-of-flight camera and the slave time-of-flight camera overlap, the slave time-of-flight camera may determine a time within a repeated interval (e.g., a second) at which the master time-of-flight camera illuminates a scene, and may select an illumination interval for the slave time-of-flight camera based on that time. Subsequently, the master time-of-flight camera and the slave time-of-flight camera may continue to illuminate the scene, in an alternating fashion, and to generate depth images or records based on the illumination of the scene. Alternatively, the master time-of-flight camera and the slave time-of-flight camera may independently illuminate the scene by varying their respective illumination power levels, modulation frequencies, or wavelengths or frequencies.

A time-of-flight camera may be outfitted with an image sensor array that has been modified to include a plurality of modulated light sensors having one or more lenses or other structures that are installed in place of one or more pixel sensors. The modulated light sensors may be specifically installed and configured to map to a field of view of the time-of-flight camera, e.g., by one or more lenses or lens assemblies, and configured to detect modulated signals and frequencies of light, or times at which modulated light is present within the field of view of the time-of-flight camera. Each of the modulated light sensors may be coupled to a transimpedance amplifier circuit, or other amplifier circuit, e.g., a bandpass filter circuit, to distinguish modulated light projected by illuminators of one or more other time-of-flight cameras from other light that may be present within the field of view of the time-of-flight camera. Information or data regarding modulated light detected using one or more modulated light sensors may be processed to identify a time-of-flight camera or other system that is responsible for the interference, the times at which the modulated light is detected, and a modulation frequency of light emitted by the interfering system. Relative times or slots within a repeated interval at which a time-of-flight camera may illuminate a field of view and expose a modified image sensor array without risk of depth interference may be determined accordingly.

Figure 2A:
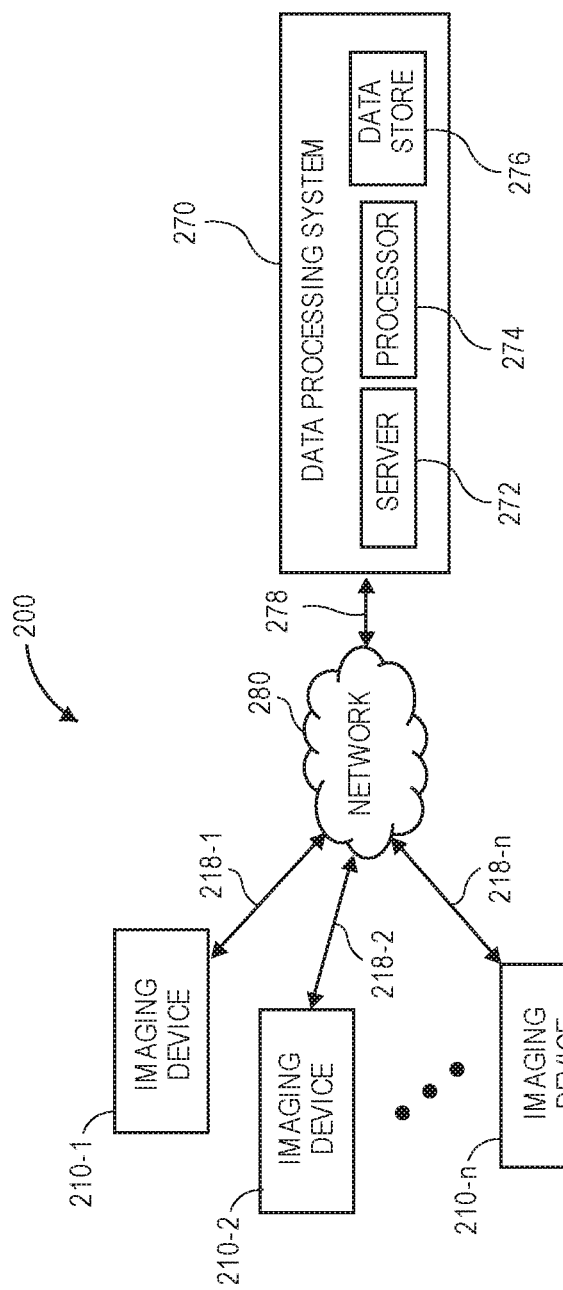
FIGS. 2A and 2B are block diagrams of one system for synchronizing time-of-flight cameras in accordance with embodiments of the present disclosure.
Figure 2B:
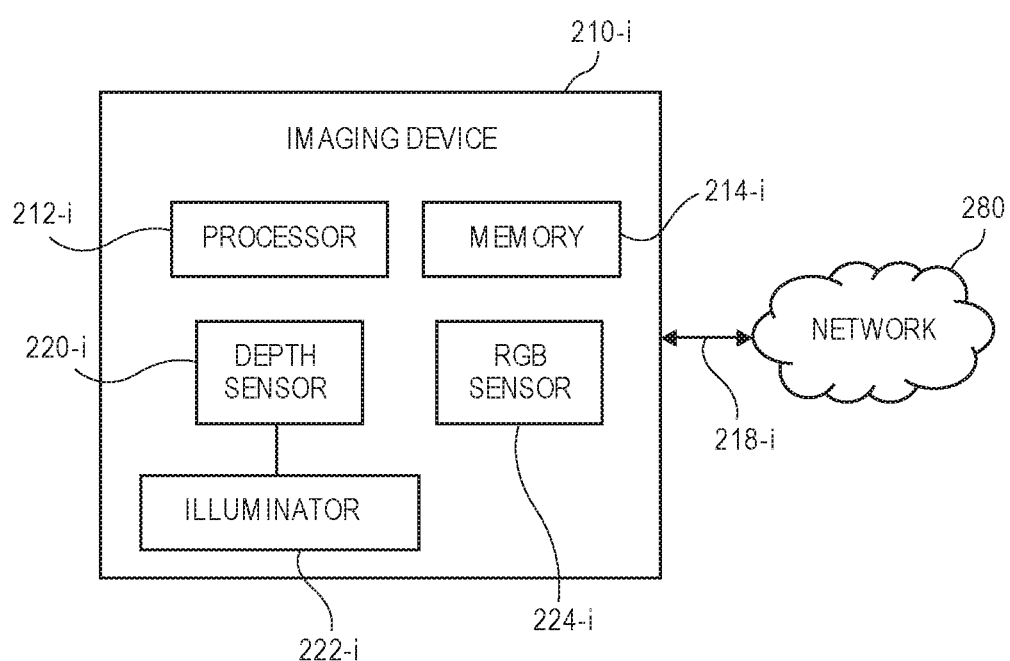

Referring to FIGS. 2A and 2B, a block diagram of one system 200 for synchronizing time-of-flight cameras in accordance with embodiments of the present disclosure is shown. The system 200 of FIGS. 2A and 2B includes a plurality of imaging devices 210-1, 210-2 . . . 210-$n$ and a data processing system 270 that are connected to one another over a network 280, which may include the Internet, in whole or in part. Except where otherwise noted, reference numerals preceded by the number "2" shown in FIGS. 2A and 2B indicate components or features that are similar to components or features having reference numerals preceded by the number "1" shown in FIGS. 1A through 1F.

The imaging devices 210-1, 210-2 . . . 210-$n$ may be any form of optical recording devices that may be used to photograph or otherwise record imaging data of structures, facilities, terrain or any other elements appearing within their respective fields of view. The imaging devices 210-1, 210-2 . . . 210-n may include one or more sensors, memory or storage components and processors, and such sensors, memory components or processors may further include one or more photosensitive surfaces, filters, chips, electrodes, clocks, boards, timers, power sources, connectors or any other relevant features (not shown). Such imaging devices 210-1, 210-2 . . . 210-n may capture imaging data in the form of one or more still or moving images of any kind or form, as well as any relevant audio signals or other information. The imaging devices 210-1, 210-2 . . . 210-n may also be adapted or otherwise configured to communicate with the data processing system 270 by way of the network 280.

Each of the imaging devices 210-1, 210-2 . . . 210-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 210-i includes one or more optical sensors, including a one or more depth sensors 220-i, one or more illuminators 222-i and one or more RGB sensors 224-i (or grayscale sensors or black-and-white sensors) that are configured to capture visual imaging data (e.g., textures) or depth imaging data (e.g., ranges) to objects within one or more fields of view of the imaging device 210-i.

The depth sensors 220-i and the RGB sensors 224-i may be any sensors having single elements or a plurality of photoreceptors or photosensitive components (e.g., a CCD sensor, a CMOS sensor, or another sensor), which may be typically arranged in an array. Light reflected from objects within a field of view of the imaging device 210-i may be captured by the depth sensors 220-i and the RGB sensors 224-i, and quantitative values, e.g., pixels, may be assigned to one or more aspects of the reflected light. The illuminators 222-i may be any system such as a laser system or a light-emitting diode (or "LED") for illuminating a portion of a scene appearing within a field of view of the imaging device 210-i, e.g., by infrared or near-infrared light, such as light with wavelengths ranging from approximately seven hundred to approximately one thousand nanometers (700-1000 nm).

The imaging device 210-i further includes one or more processors 212-i and one or more memory components 214-i, and any other components (not shown) that may be required in order to capture, analyze and/or store imaging data. For example, the imaging device 210-i may capture one or more still or moving images (e.g., streams of visual and/or depth image frames), along with any relevant audio signals or other information (e.g., position data), and may also connect to or otherwise communicate with the server 272, or any other computer devices over the network 280, through the sending and receiving of digital data. In some implementations, the imaging device 210-i may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the network 280 directly. The processors 212-i may be configured to process imaging data captured by one or more of the depth sensors 220-i or the RGB sensors 224-i. For example, in some implementations, the processors 212-i may be configured to execute any type or form of machine learning algorithm or technique, e.g., an artificial neural network.

The imaging devices 210-1, 210-2 . . . 210-n may be homogenous or heterogeneous in nature, in accordance with the present disclosure. For example, one or more of the imaging devices 210-1, 210-2 . . . 210-n may have both the depth sensor 220-i and the RGB sensor 224-i. Alternatively, one or more of the imaging devices 210-1, 210-2 . . . 210-n may have just a depth sensor 220-i or just a RGB sensor 224-i (or grayscale sensor or black-and-white sensor). For example, one or more of the imaging devices 210-1, 210-2 . . . 210-n may be an RGB color camera, a still camera, a motion capture/video camera or any other type or form of camera. In other implementations, one or more of the imaging devices 210-1, 210-2 . . . 210-n may be depth-sensing cameras, such as an RGBz or RGBD camera. In still other implementations, one or more of the imaging devices 210-1, 210-2 . . . 210-n may be a thermographic or infrared (IR) camera. Additionally, in some implementations, the imaging devices 210-1, 210-2 . . . 210-n may simply be camera modules that include a lens and an image sensor configured to convert an optical image obtained using the lens of the camera into a digital signal or digital representation of the image (generally referred to herein as imaging data).

The imaging devices 210-1, 210-2 . . . 210-n may also include manual or automatic features for modifying their respective fields of view or orientations. For example, one or more of the imaging devices 210-1, 210-2 . . . 210-n may be configured in a fixed position, or with a fixed focal length (e.g., fixed-focus lenses) or angular orientation. Alternatively, one or more of the imaging devices 210-1, 210-2 . . . 210-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 210-1, 210-2 . . . 210-n, or changes in one or more of the angles defining the angular orientation.

For example, one or more of the imaging devices 210-1, 210-2 . . . 210-n may be hard-mounted to a support or mounting that maintains the device in a fixed configuration or angle with respect to one, two or three axes. Alternatively, however, one or more of the imaging devices 210-1, 210-2 . . . 210-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 210-1, 210-2 . . . 210-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

Although the system 200 of FIG. 2A includes boxes corresponding to three imaging devices 210-1, 210-2 . . . 210-n, those of ordinary skill in the pertinent arts will recognize that any number or type of imaging devices may be operated in accordance with the present disclosure, including but not limited to digital cameras, depth sensors or range cameras, infrared cameras, radiographic cameras or other devices having one or more optical sensors. In some implementations, the system 200 may include dozens or even hundreds of imaging devices of any type or form.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2A may be independently provided for the exclusive purpose of receiving, analyzing or storing imaging data or other information or data received from the imaging devices 210-1, 210-2 . . . 210-n or, alternatively, provided in connection with one or more physical or virtual services configured to receive, analyze or store such imaging data or other information or data, as well as one or more other functions. In some embodiments, the data processing system 270 may be associated with a fulfillment center, a warehouse, a retail establishment, a transportation center or any other physical or virtual facility.

The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the imaging devices 210-1, 210-2 . . . 210-n, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more vehicles, e.g., an unmanned aerial vehicle.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The imaging devices 210-1, 210-2 . . . 210-n and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the imaging devices 210-1, 210-2 . . . 210-n may be adapted to transmit information or data in the form of synchronous or asynchronous messages to the data processing system 270 or to any other computer device in real time or in near-real time, or in one or more offline processes, via the network 280. Those of ordinary skill in the pertinent art would recognize that the imaging devices 210-1, 210-2 . . . 210-n or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212-i or the processor 274, or any other computers or control systems utilized by the imaging devices 210-1, 210-2 . . . 210-n or the data processing system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD- ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
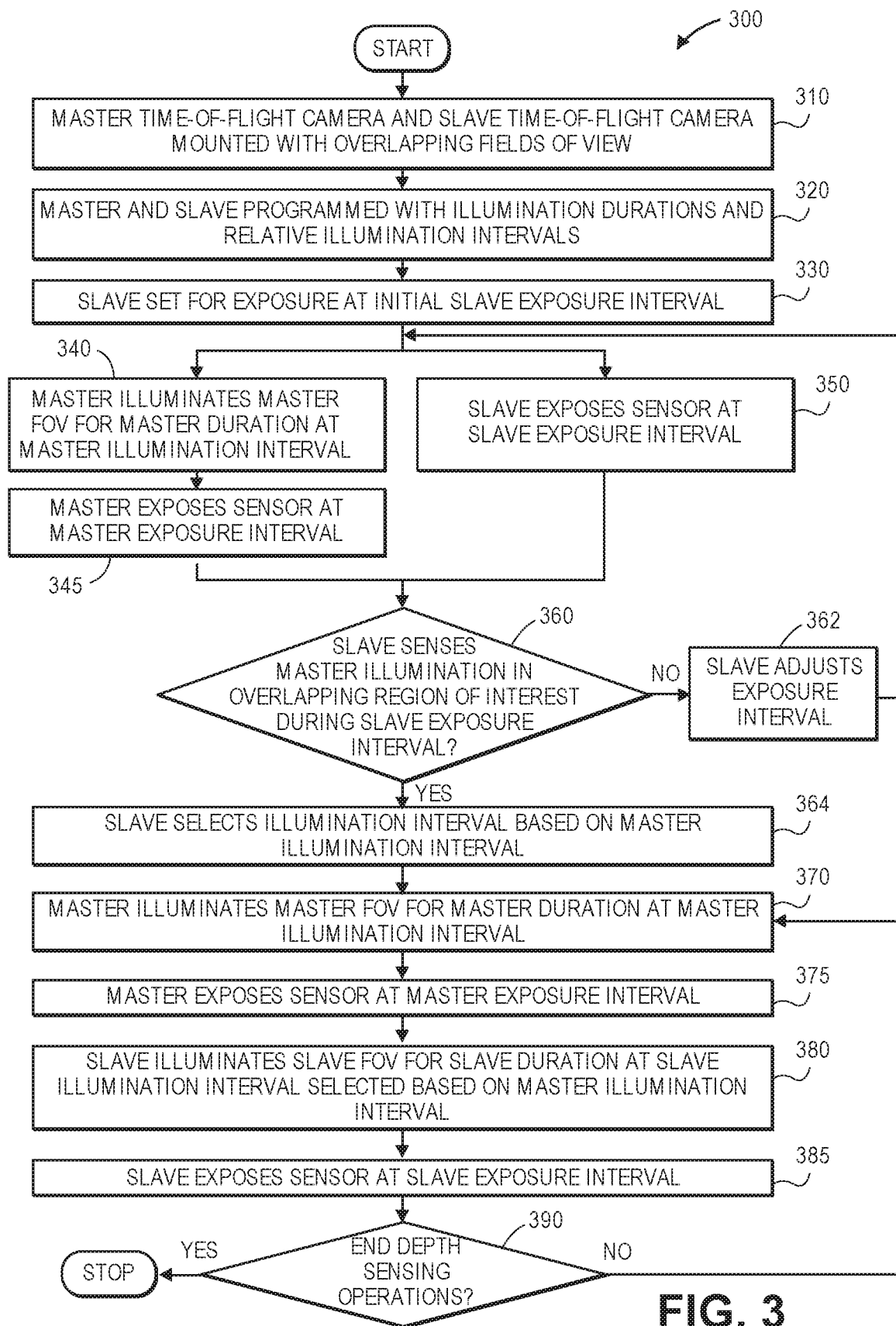
FIG. 3 is a flow chart of one process for synchronizing time-of-flight cameras in accordance with embodiments of the present disclosure.

Referring to FIG. 3, a flow chart 300 of one process for synchronizing time-of-flight cameras in accordance with embodiments of the present disclosure is shown. At box 310, a master time-of-flight camera and a slave time-of-flight camera are mounted with overlapping fields of view. For example, in some embodiments, the master time-of-flight camera and the slave time-of-flight camera may be mounted in a working environment such as a fulfillment center, a warehouse, a retail establishment, a transportation center or another location where depth sensing operations are desired. Alternatively, the master time-of-flight camera and the slave time-of-flight camera may be mounted in association with a single vehicle (e.g., a single autonomous mobile robot or unmanned aerial vehicle), or multiple vehicles (e.g., one or more autonomous mobile robots or unmanned aerial vehicles), or in any other setting or configuration.

At box 320, the master time-of-flight camera and the slave time-of-flight camera are programmed with illumination durations and relative illumination intervals. For example, the master time-of-flight camera and the slave time-of-flight camera may each be programmed with a data record, a file or another set of instructions identifying times within a repeated interval at which each of the master time-of-flight camera and the slave time-of-flight camera is to be illuminated, and for which durations. The repeated interval may have a standard duration of time (e.g., one second, ten seconds, one minute, ten minutes, one hour, or the like), and the master time-of-flight camera and the slave time-of-flight cameras may be programmed to illuminate their respective fields of view for discrete durations within the repeated interval, e.g., for fractions of the repeated interval, such as fractions of one second within one second. The relative illumination intervals may be defined with respect to the repeated interval, e.g., at points within the one second, such as at one-quarter second and at one-half second intervals, or with respect to one another. For example, the repeated interval may be partitioned into time slots, and one of the time slots may be assigned to the master time-of-flight camera, while another, preferably non-adjacent, time slot may be assigned to the slave time-of-flight camera. Additionally, or alternatively, e.g., where operations of the master time-of-flight camera and the slave time-of-flight camera are to be multiplexed on bases other than time, the master time-of-flight camera and the slave time-of-flight camera may be programmed with power levels, modulation frequencies, or illumination wavelengths or frequencies.

At box 330, the slave time-of-flight camera is set for exposure at an initial slave exposure interval. For example, the slave time-of-flight camera may be initially programmed to expose its sensor for a fraction of a second (e.g., two hundred milliseconds, or 200 ms) within a repeated interval of a second. Additionally, or alternatively, the slave time-of-flight camera may be set for exposure at an initial power level, modulation frequency, or illumination wavelength or frequency, or the like.

At box 340, the master time-of-flight camera illuminates a master field-of-view for a master duration at a master illumination interval. For example, in some embodiments, the master time-of-flight camera may transmit a modulated infrared light pulse for a predetermined duration (e.g., one hundred milliseconds, or 100 ms) during a repeated interval. Additionally, or alternatively, the master time-of-flight camera may also be illuminated at a master power level, a master modulation frequency, or at a master illumination wavelength or frequency.

At box 345, the master time-of-flight camera exposes its sensor at the master exposure interval. For example, as is discussed above, the master time-of-flight camera's sensor may capture light reflected from points within the field of view of the master time-of-flight camera. The reflected light may be processed to determine ranges to such points, and a depth image or profile (or a range image or profile) may be defined with respect to the master time-of-flight camera based on such ranges. Because the speed of light is approximately 300 million meters per second, or $3.0 \times 10^8$ m/s, light may travel from the illuminator to a point at a scene that is ten meters (10 m) away, and be reflected back to the sensor, in approximately 3.33 microseconds, or $3.33 \times 10^{-6}$ s. Therefore, in some embodiments, a master exposure interval may encompass a master illumination interval, in whole or in part. In parallel, at box 350, the slave time-of-flight camera exposes its sensor at a slave exposure interval.

At box 360, whether the slave time-of-flight camera senses the master illumination in an overlapping region of interest during the slave exposure interval is determined. For example, the slave time-of-flight camera may be programmed to monitor all or one or more selected portions of the field of view that overlap with the field of view of the master time-of-flight camera. If the slave time-of-flight camera does not sense the master illumination in the overlapping region of interest, then the process advances to box 362, where the slave time-of-flight camera adjusts its exposure interval, before returning to box 340 and box 350, where the master time-of-flight camera illuminates its field of view for the master duration at the master illumination interval, and to box 350, where the slave time-of-flight camera exposes its sensor at the adjusted slave exposure interval. The adjusted slave exposure interval may be determined on any basis. For example, the slave time-of-flight camera may divide a repeated interval in half, and establish the initial slave exposure interval based on half of the repeated interval. If the master time-of-flight illumination of the overlapping region of interest is not detected within the initial slave exposure interval, an adjusted slave exposure interval may be defined by the other half of the repeated interval. Subsequently, the adjusted slave exposure interval may be repeatedly halved until the master time-of-flight illumination is detected within a sufficiently small portion of the repeated interval, e.g., a size of one or more predetermined slots.

If the slave time-of-flight camera senses the master illumination in an overlapping region of interest during the slave exposure interval, however, then the process advances to box 364, where a slave illumination interval is selected based on the master illumination interval. For example, as is discussed above, the master time-of-flight camera and the slave time-of-flight camera may be programmed with relative times or slots within a repeated interval at which the slave time-of-flight camera may illuminate a scene or expose a sensor. Once the master illumination interval is determined, the slave illumination interval may be selected based on the master illumination interval.

After a slave illumination interval has been selected, the process advances to box 370, where the master time-of-flight camera illuminates the master field of view for the master duration at the master illumination interval. For example, in some embodiments, an illuminator in the master time-of-flight camera may illuminate a scene within a field of view in its entirety, or a portion of the scene, by modulated infrared light or other light at other frequencies or wavelengths. At box 375, the master time-of-flight camera exposes its sensor at the master exposure interval. Based on the light that is reflected off points of the scene and captured by pixels of the sensor of the master time-of-flight camera, a depth image or profile (or range image or profile) of the scene may be calculated from the perspective of the master time-of-flight camera, and stored in one or more data stores.

At box 380, the slave time-of-flight camera illuminates a slave field of view for a slave duration and at the slave illumination interval that was selected based on the master illumination interval at box 364. At box 385, the slave time-of-flight camera exposes its sensor at the slave exposure interval. For example, as is discussed above, because the speed of light is significantly high, the slave exposure interval may, in some embodiments, encompass the slave illumination interval in whole or in part. As is also discussed above, based on the light that is reflected off points of the scene and captured by pixels of the sensor of the slave time-of-flight camera, a depth image or profile (or range image or profile) of the scene may be calculated from the perspective of the slave time-of-flight camera, and stored in one or more data stores.

At box 390, whether the depth sensing operations are to be ended is determined. If the depth sensing operations are to continue, then the process returns to box 370. If the depth sensing operations are no longer desired or required, however, then the process ends.

As is discussed above, a slave exposure interval may be selected in order to detect an illumination of a scene by a master time-of-flight camera, or to iteratively narrow an interval in which the illumination of the scene by the master time-of-flight camera is detected by a slave time-of-flight camera. Once the slave time-of-flight camera detects an illumination of the scene by the master time-of-flight camera, the slave time-of-flight camera may select its illumination interval in accordance with a predetermined program, e.g., within a slot designated for the slave time-of-flight camera, in an effort to ensure that the slave time-of-flight camera does not expose its sensor when the master time-of-flight camera illuminates the scene, or that the master time-of-flight camera does not expose its sensor when the slave time-of-flight camera illuminates the scene.

Referring to FIGS. 4A through 4E, views of aspects of one system for synchronizing time-of-flight cameras in accordance with embodiments of the present disclosure are shown. Except where otherwise noted, reference numerals preceded by the number "4" shown in FIGS. 4A through 4E indicate components or features that are similar to components or features having reference numerals preceded by the number "2" shown in FIG. 2A or FIG. 2B, or by the number "1" shown in FIGS. 1A through 1F.

Figure 4A:
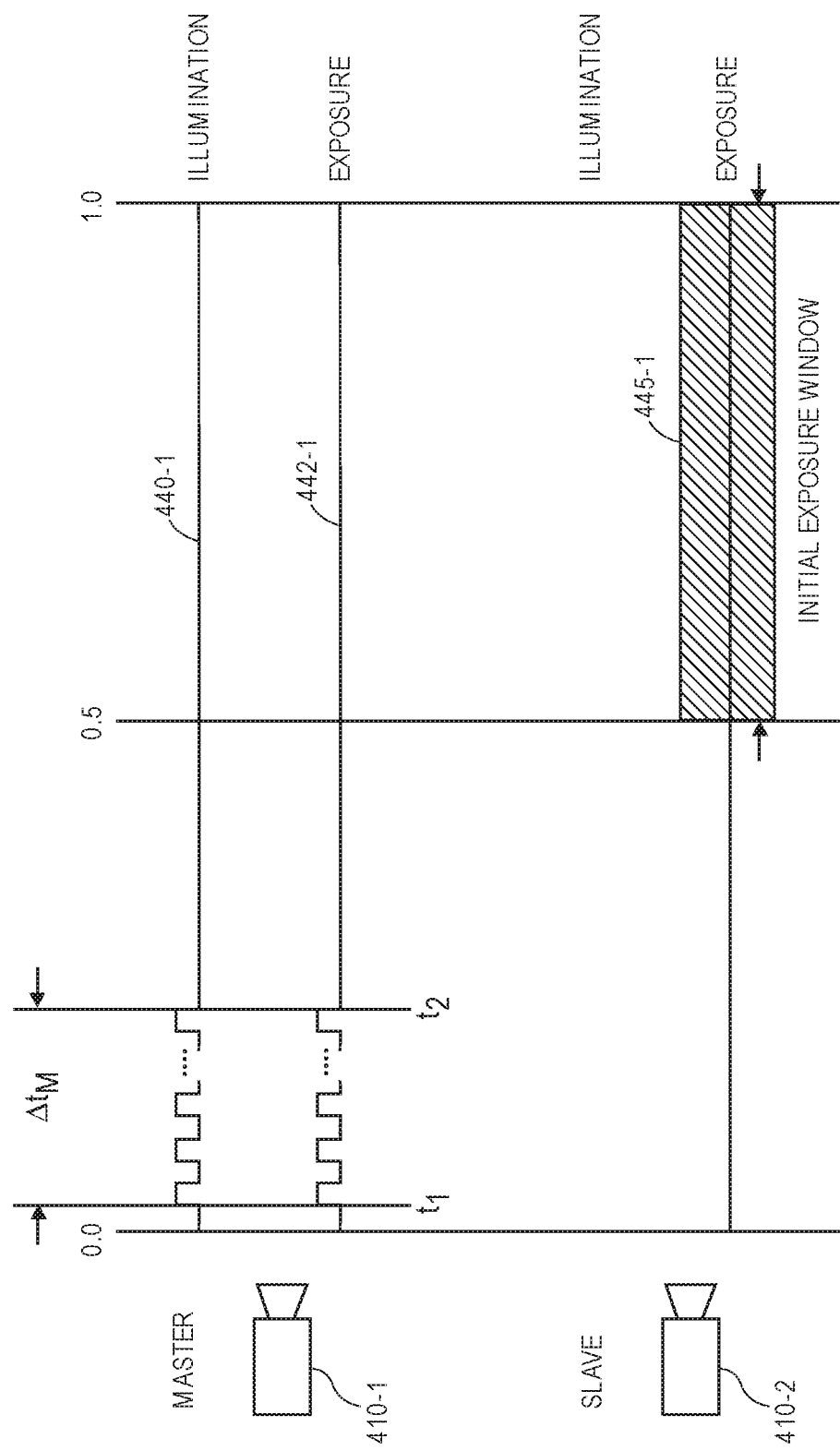

As is shown in FIG. 4A, a master time-of-flight camera 410-1 illuminates a scene by projecting modulated light 440-1 (e.g., a pulse of modulated infrared light) onto surfaces of the scene appearing within a field of view for a duration $\Delta t$ beginning at a time $t_1$ and ending at a time $t_2$ within a repeated interval (or frame time) of one second. For example, in some embodiments, the master time-of-flight camera 410-1 may be programmed to transmit pulses of modulated infrared light within regular slots defined by times $t_1$ and $t_2$ within the repeated interval.

Reflected light 442-1 is received by a sensor of the master time-of-flight camera 410-1 having a plurality of photoreceptors or photosensitive components (e.g., a CCD sensor, a CMOS sensor, or another sensor) arranged in an array. For each of such components, times at which the reflected light is received from a portion of the scene may be determined. In some embodiments, the master time-of-flight camera 410-1 may expose the sensor at discrete times or for discrete durations within the one-second repeated interval. In some embodiments, the master time-of-flight camera may expose the sensor at the same time as the illumination, e.g., at intervals that overlap the intervals of illumination.

Distances from the master time-of-flight camera 410-1 to each of the portions of the scene within the field of view may be determined as functions of differences between the times at which the modulated light 440-1 is projected and the times the reflected light 442-1 is captured by the sensor and the speed of light. A depth image or profile for the portions of the scene appearing within the field of view of the master time-of-flight camera 410-1 may be generated based on each of such distances.

As is also shown in FIG. 4A, a slave time-of-flight camera 410-2 may establish an initial exposure window 445-1 within the repeated interval, and be programmed to capture reflected light from portions of the scene appearing within the field of view of the slave time-of-flight camera 410-2, e.g., within a region of interest defined by overlapping fields of view of the master time-of-flight camera 410-1 and the slave time-of-flight camera 410-2, such as the region of interest 135 of FIGS. 1A through 1F. For example, the slave time-of-flight camera 410-2 may select approximately half of a repeated interval (e.g., a second half of the one-second repeated interval, as is shown in FIG. 4A), and define the initial exposure window 445-1 to expose its sensor for this portion of the one-second repeated interval.

Figure 4B:
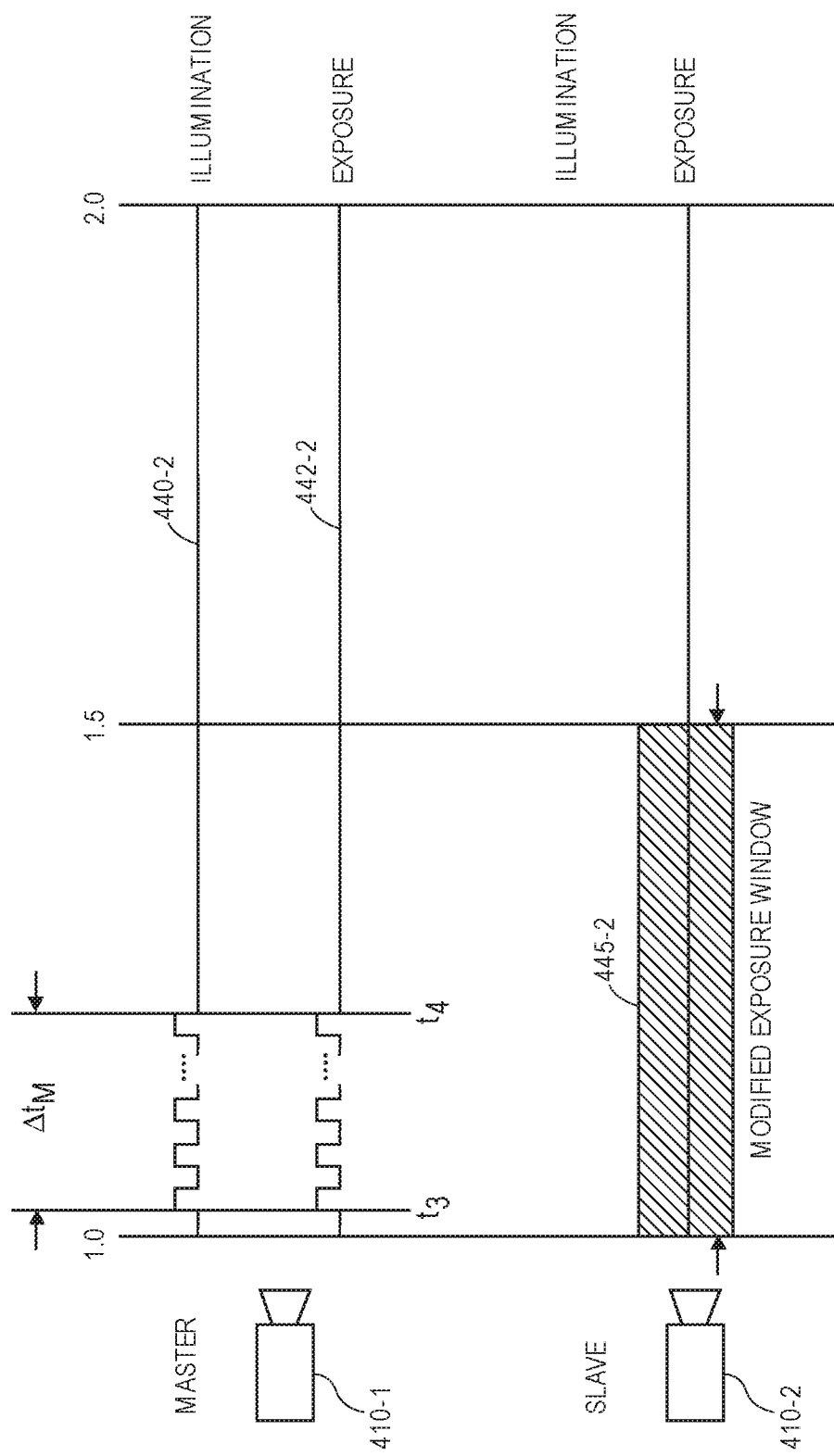

If the slave time-of-flight camera 410-2 does not detect the reflected light 442-1 within the initial exposure window 445-1, the slave time-of-flight camera 410-2 may select a different window within the one-second repeated interval. For example, as is shown in FIG. 4B, after failing to detect the illumination of the scene by the master time-of-flight camera 410-1 within the second half of the one-second repeated interval, the slave time-of-flight camera 410-2 may define a modified exposure window 445-2 to include a first half of the one-second repeated interval. If the slave time-of-flight camera 410-2 does not detect reflected light 442-2 from modulated light 440-2 projected upon the scene by the master time-of-flight camera 440-1 within the modified exposure window 445-2 (e.g., the first half) of the one-second repeated interval, then the slave time-of-flight camera 410-2 may assume that its field of view does not overlap with that of the master time-of-flight camera 410-1, or a field of view of any other time-of-flight camera. The master time-of-flight camera 410-1 may further determine distances to portions of the scene within the field of view, and generate a depth image or profile for the portions of the scene, as functions of differences between times at which the modulated light 440-2 is projected and times at which the reflected light 442-2 is captured by the sensor, and the speed of light.

Figure 4C:
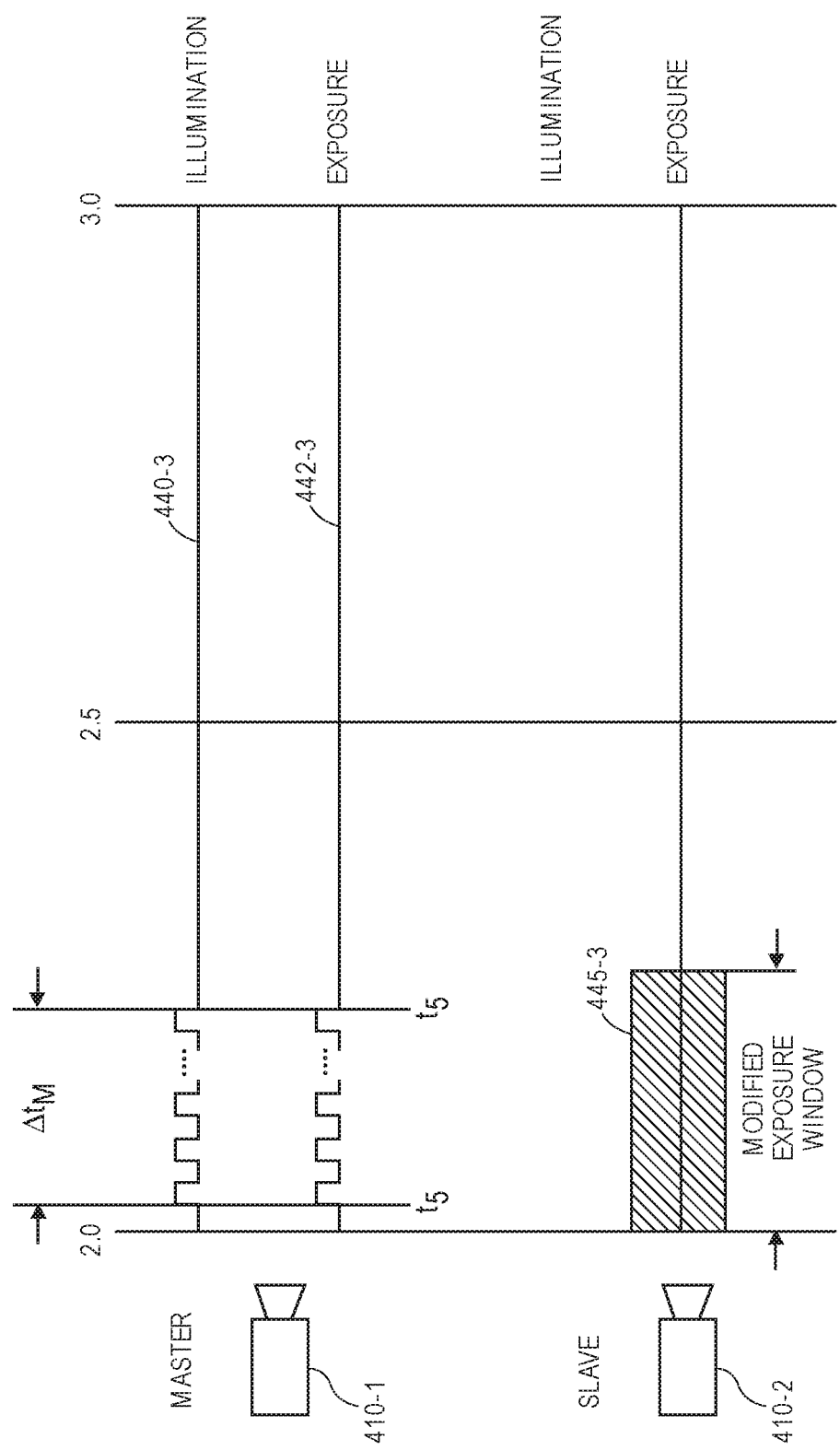

If the slave time-of-flight camera 410-2 does detect the reflected light 442-2 from the modulated light 440-2 within the modified exposure window 445-2, however, such as is shown in FIG. 4B, the slave time-of-flight camera 410-2 may further modify the exposure window to iteratively narrow down a specific time at which the master time-of-flight camera 410-1 is exposing its field of view. For example, as is shown in FIG. 4C, after detecting the reflected light 442-2 within the modified exposure window 445-2, the slave time-of-flight camera 410-2 may define a narrower exposure window 445-3, viz., approximately one-quarter of the repeated interval. The master time-of-flight camera 410-1 may further determine distances to portions of the scene within the field of view, and generate a depth image or profile for the portions of the scene, as functions of differences between times at which the modulated light 440-3 is projected and times at which the reflected light 442-3 is captured by the sensor, and the speed of light.

Likewise, if the slave time-of-flight camera 410-2 detects reflected light 442-3 from modulated light 440-3 projected upon the scene by the master time-of-flight camera 440-1 within the modified exposure window 445-3, such as is shown in FIG. 4C, the slave time-of-flight camera 410-2 may further identify a narrower exposure window 445-4, viz., approximately one-eighth of the repeated interval. The master time-of-flight camera 410-1 may further determine distances to portions of the scene within the field of view, and generate a depth image or profile for the portions of the scene, as functions of differences between times at which the modulated light 440-4 is projected and times at which the reflected light 442-4 is captured by the sensor, and the speed of light.

As is shown in FIG. 4D, where the modified exposure window 445-4 is sufficiently small, thereby identifying a time slot at which the master time-of-flight camera 410-1 illuminates the scene within the repeated interval with an acceptable degree of certainty, the slave time-of-flight camera 410-2 may determine an illumination window 450-1 in accordance with a predetermined program, e.g., within a slot designated for the slave time-of-flight camera 410-2, and to avoid conflict with the illumination of the scene by the master time-of-flight camera 410-1.

Figure 4E:
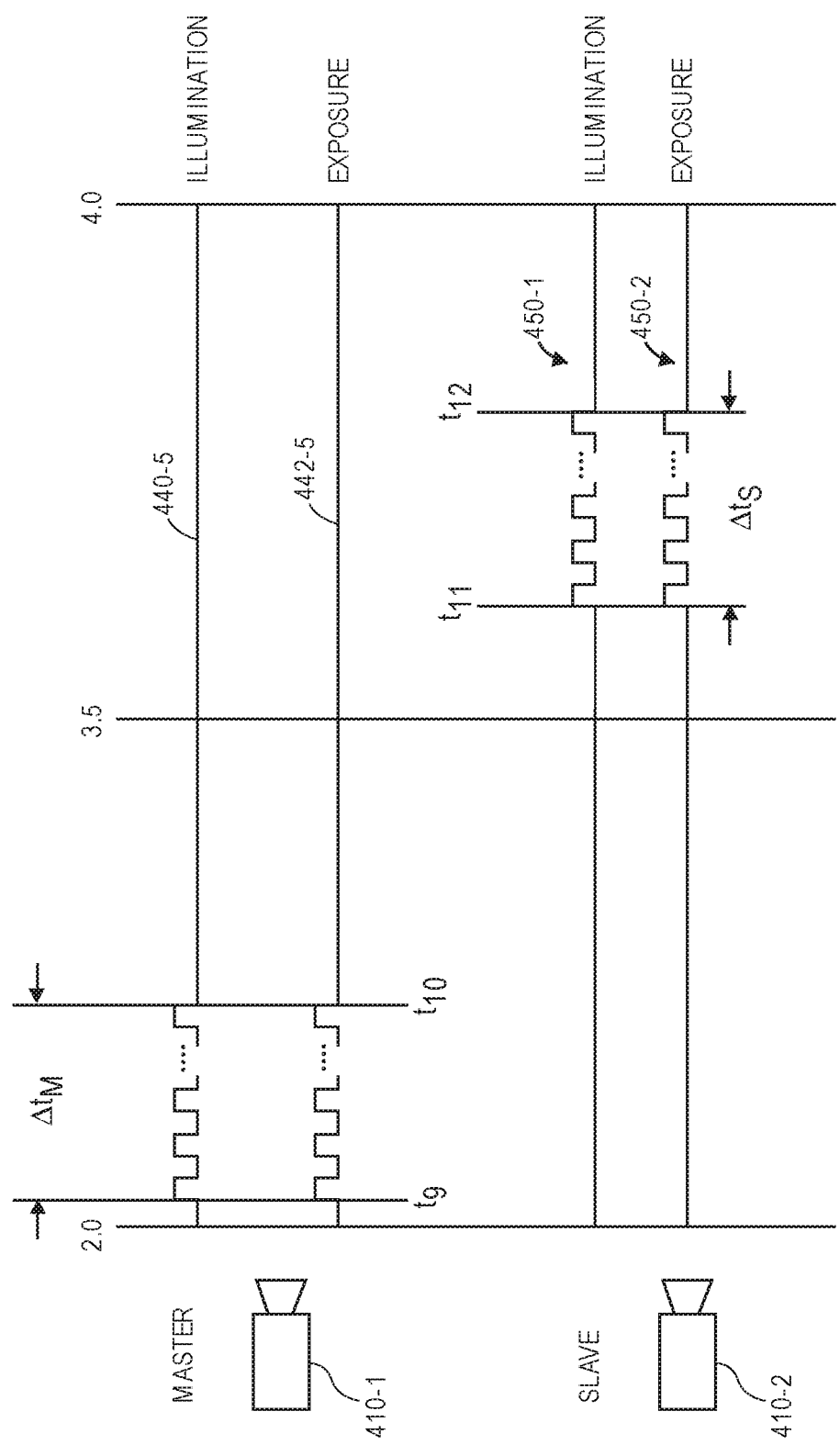

Thus, as is shown in FIG. 4E, the master time-of-flight camera 410-1 may continue to illuminate the scene by modulated light 440-5 at a designated illumination interval within the repeated interval, and may further determine distances to portions of the scene within the field of view, and generate a depth image or profile for the portions of the scene, based on reflected light 442-5, as functions of differences between times at which the modulated light 440-5 is projected and times at which the reflected light 442-5 is captured by the sensor, and the speed of light. Likewise, as is also shown in FIG. 4E, the slave time-of-flight camera 410-2 may begin to illuminate the scene at a designated illumination interval within the repeated interval, and at an offset from the designated illumination interval of the master time-of-flight camera 410-1. The slave time-of-flight camera 410-2 may also determine distances to portions of the scene within its field of view, and generate a depth image or profile for the portions of the scene, as functions of differences between times at which the modulated light 450-1 is projected and times at which the reflected light 452-2 is captured by the sensor, and the speed of light.

An illumination interval of a slave time-of-flight camera may be defined by a selected time after an illumination of a master time-of-flight camera, e.g., after a predetermined number of milliseconds. Alternatively, an illumination interval of the slave time-of-flight camera may be defined as a portion of a repeated interval with respect to an illumination interval of the master time-of-flight camera, e.g., within a slot of the repeated interval that is sufficiently discrete or offset from a slot of the repeated interval corresponding to the illumination interval of the master time-of-flight camera.

Referring to FIG. 5, a view of aspects of one system for synchronizing time-of-flight cameras in accordance with embodiments of the present disclosure are shown. Except where otherwise noted, reference numerals preceded by the number "5" shown in FIG. 5 indicate components or features that are similar to components or features having reference numerals preceded by the number "4" shown in FIGS. 4A through 4E, by the number "2" shown in FIG. 2A or FIG. 2B, or by the number "1" shown in FIGS. 1A through 1F.

As is shown in FIG. 5, a system 500 having a master time-of-flight camera 510-1, a slave time-of-flight camera 510-2 and a server 572 is shown. The master time-of-flight camera 510-1, the slave time-of-flight camera 510-2 and the server 572 are connected to one another over a network 580, which may include the Internet in whole or in part. The master time-of-flight camera 510-1 and the slave time-of-flight camera 510-2 have overlapping fields of view.

As is also shown in FIG. 5, the server may generate a data record 540 (or other set of instructions) corresponding to a regular interval 540 of time (viz., one second). The data record 540 of time is divided into ten slots, each of approximately one-tenth of one second, or one hundred milliseconds (100 ms), in length. The data record 540 may be used to program the master time-of-flight camera 510-1 and the slave time-of-flight camera 510-2 to illuminate a scene at discrete intervals without interfering with one another.

Thus, when the slave time-of-flight camera 510-2 detects that at least the portion of its field of view that overlaps with the field of view of the master time-of-flight camera 510-1 has been illuminated, the slave time-of-flight camera 510-2 may select a period of time, e.g., one of the slots, as defined by the data record 540, during which the slave time-of-flight camera 510-2 is to illuminate the scene. Therefore, by programming each of the master time-of-flight camera 510-1 and the slave time-of-flight camera 510-2 with the data record 540, the master time-of-flight camera 510-1 and the slave time-of-flight camera 510-2 may be instructed to generate depth images or profiles of a scene without interfering with one another, once the slave time-of-flight camera 510-2 determines a time and/or an interval at which the master time-of-flight camera 510-1 is illuminating the scene.

As is discussed above, the operation of two or more time-of-flight cameras having overlapping fields of view to generate depth imaging data from a scene may be multiplexed by time, such as is shown in FIG. 5, e.g., by synchronizing the time-of-flight cameras to illuminate the scene at different times or for different intervals. Alternatively, as is also discussed above, the operation of the two or more time-of-flight cameras may be multiplexed in any number of other ways, including by operating the time-of-flight cameras to illuminate the scene at different power levels or modulation frequencies, or with light at different wavelengths or frequencies, in accordance with the present disclosure.

The systems and methods of the present disclosure may be used to synchronize the operation of any number of time-of-flight cameras, any of which may act as a master or slave to another time-of-flight camera. Referring to FIGS. 6A through 6E, views of aspects of one system for synchronizing time-of-flight cameras in accordance with embodiments of the present disclosure are shown. Except where otherwise noted, reference numerals preceded by the number "6" shown in FIGS. 6A through 6E indicate components or features that are similar to components or features having reference numerals preceded by the number "5" shown in FIG. 5, by the number "4" shown in FIGS. 4A through 4E, by the number "2" shown in FIG. 2A or FIG. 2B, or by the number "1" shown in FIGS. 1A through 1F.

Figure 6A:
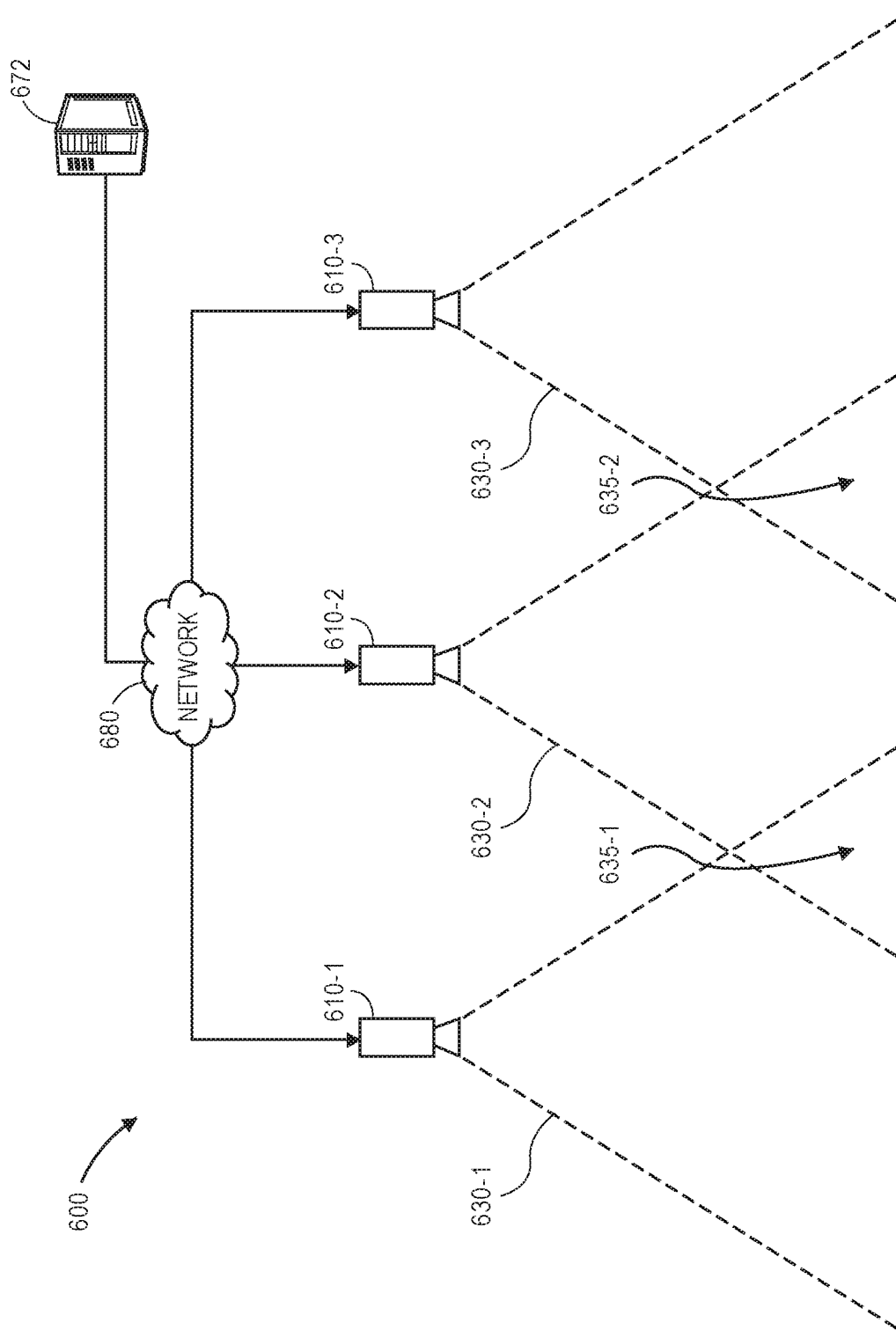
FIGS. 6A through 6E are views of aspects of one system for synchronizing time-of-flight cameras in accordance with embodiments of the present disclosure.

As is shown in FIG. 6A, a system 600 includes three time-of-flight cameras 610-1, 610-2, 610-3 and a server 672 that are connected to one another over a network 680, which may include the Internet in whole or in part. The first time-of-flight camera 610-1 has a first field of view 630-1. The second time-of-flight camera 610-2 has a second field of view 630-2. The third time-of-flight camera 610-3 has a third field of view 630-3. The first field of view 630-1 and the second field of view 630-2 overlap in a first region of interest 635-1. The second field of view 630-2 and the third field of view 630-3 overlap in a second region of interest 635-2.

Figure 6B:
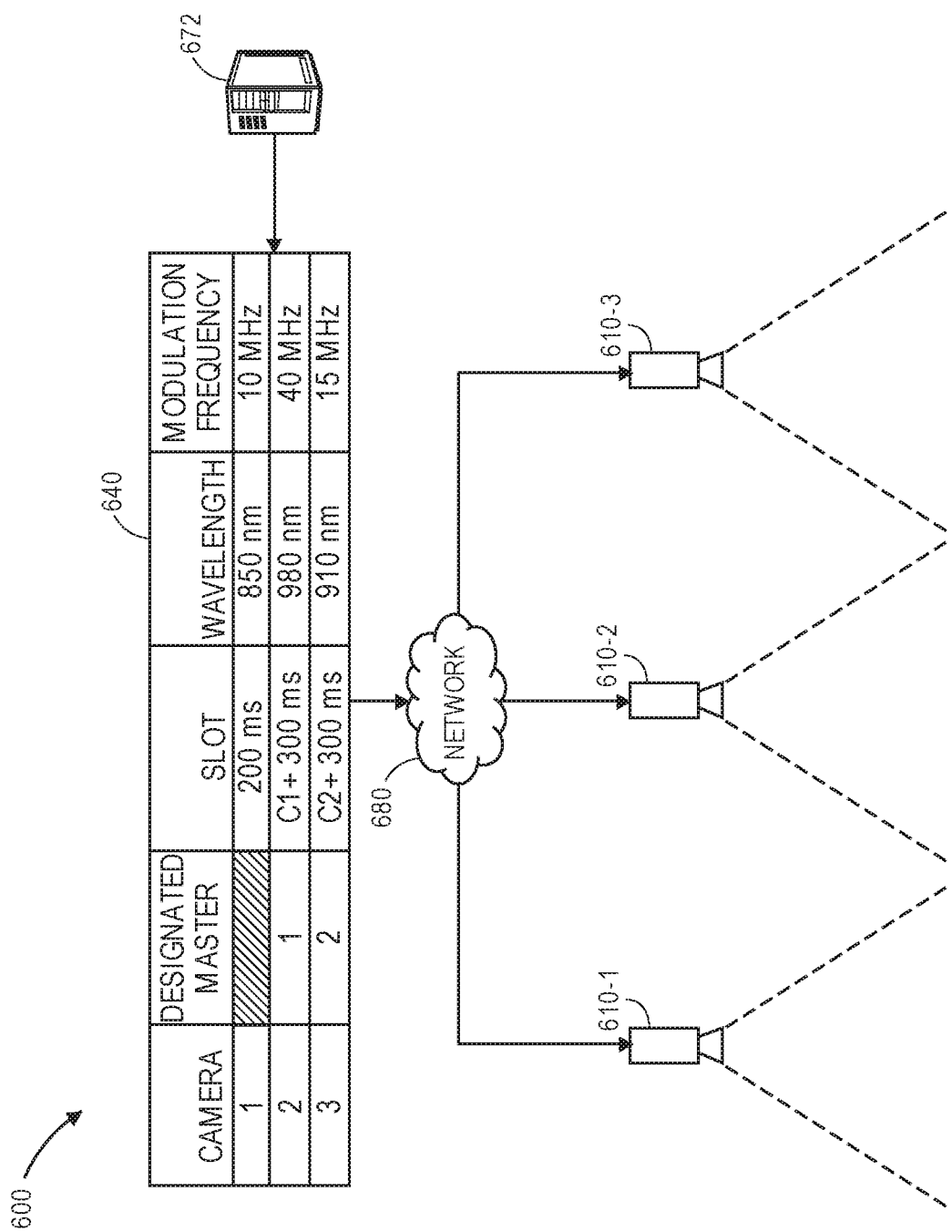

Each of the time-of-flight cameras 610-1, 610-2, 610-3 may be programmed with instructions designating each of such cameras as a master to another time-of-flight camera, or a slave to another time-of-flight camera, and with a designation of an illumination interval and/or exposure interval, as well as properties of light to be projected by the respective time-of-flight cameras on the scene. As is shown in FIG. 6B, the server 672 generates a data record 640 and transmits the data record 640 to each of the time-of-flight cameras 610-1, 610-2, 610-3 over the network 680. For example, the data record 640 indicates that the first time-of-flight camera 610-1 does not have a designated master, but is scheduled to illuminate the scene within a slot beginning at the two hundred millisecond (200 ms) mark of a repeated interval, with a modulated infrared light having a wavelength of eight hundred fifty nanometers (850 nm), and at a modulation frequency of ten megahertz (10 MHz). The data record 640 further designates the first time-of-flight camera 610-1 as the master to the second time-of-flight camera 610-2, which is scheduled to illuminate the scene within a slot beginning three hundred milliseconds (300 ms) after the slot in which the scene is illuminated by the first time-of-flight camera 610-1 within the repeated interval, using a modulated infrared light having a wavelength of nine hundred eighty nanometers (980 nm), and at a modulation frequency of forty megahertz (40 MHz). The data record 640 also designates the second time-of-flight camera 610-2 as the master to the third time-of-flight camera 610-3, which is to illuminate the scene within a slot beginning three hundred milliseconds (300 ms) after the slot in which the scene is illuminated by the second time-of-flight camera 610-2 within the repeated interval, using a modulated infrared light having a wavelength of nine hundred ten nanometers (910 nm), and at a modulation frequency of fifteen megahertz (15 MHz).

Figure 6C:
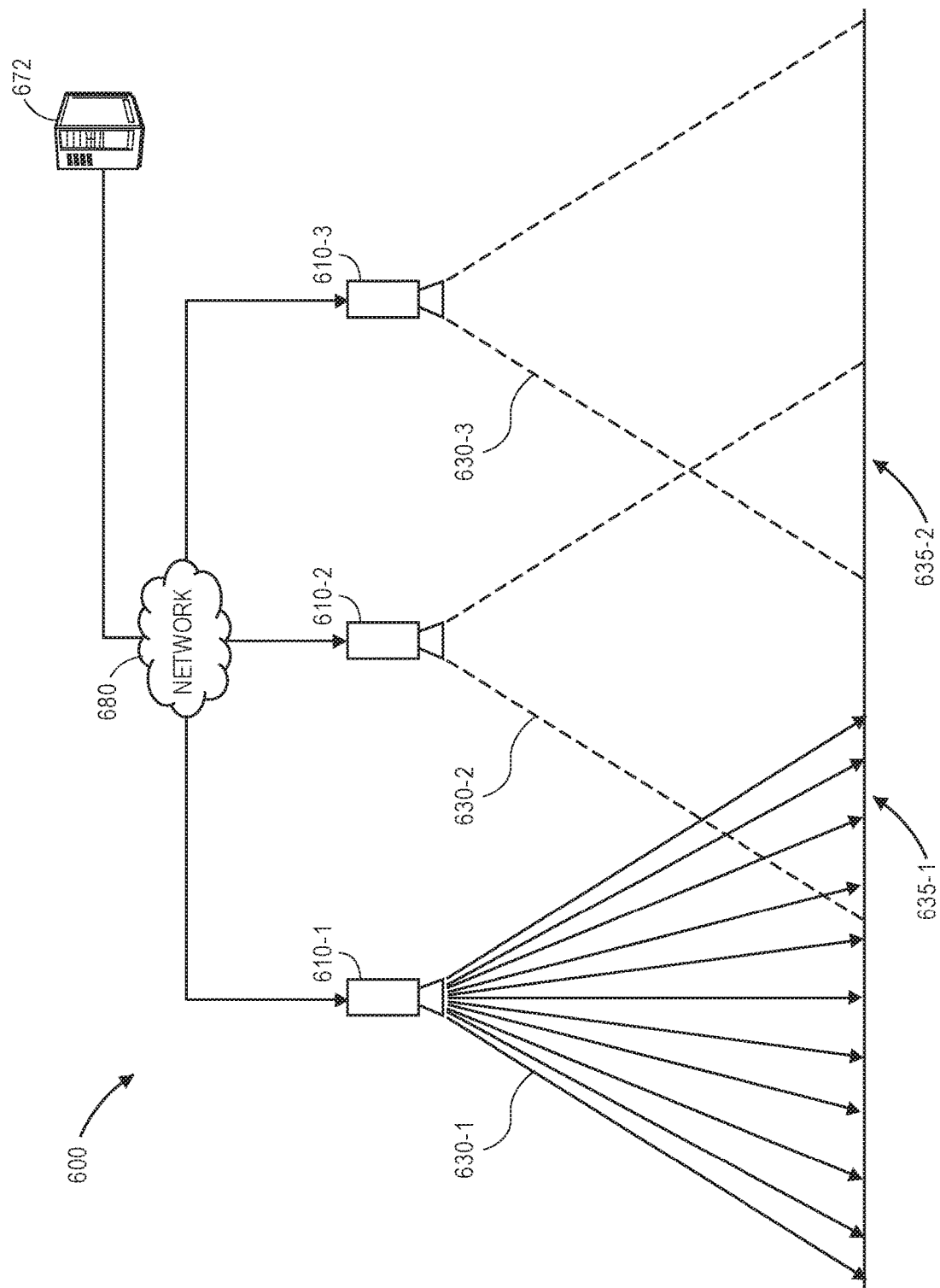

As is shown in FIG. 6C, the first time-of-flight camera 610-1 illuminates the first field of view 630-1 at the scene at a predetermined time. The second time-of-flight camera 610-2 monitors at least a portion of the first field of view 630-1, including the first region of interest 635-1. Upon detecting the illumination of the first region of interest 635-1, the second time-of-flight camera 610-2 may determine a time at which the second time-of-flight camera 610-2 is to illuminate the second field of view 630-2, based on the data record 640. For example, as is shown in the data record 640 of FIG. 6B, the second time-of-flight camera 610-2 may be programmed to illuminate the second field of view 630-2 three hundred milliseconds (300 ms) after the first time-of-flight camera 610-1 illuminates the first field of view 630-1.

The second time-of-flight camera 610-2 may be programmed to determine whether the entire field of view 630-2 is illuminated, or whether the first region of interest 635-1 is illuminated, e.g., by monitoring selected photoreceptors or photosensitive components of a sensor of the second time-of-flight camera 610-2 corresponding to the first region of interest 635-1. Additionally, in some embodiments, the second time-of-flight camera 610-2 may be programmed to determine whether light at any frequency or wavelength is reflected from surfaces within the second field of view 630-2 in general or the first region of interest 635-1 in particular. Alternatively, in some embodiments, the second time-of-flight camera 610-2 may be programmed to determine whether the second field of view 630-2 and/or the first region of interest 635-1 is illuminated with light having one or more properties designated in the data record 640, e.g., light having a wavelength of eight hundred fifty nanometers (850 nm), or light emitted at a modulation frequency of ten megahertz (10 MHz).

Figure 6D:
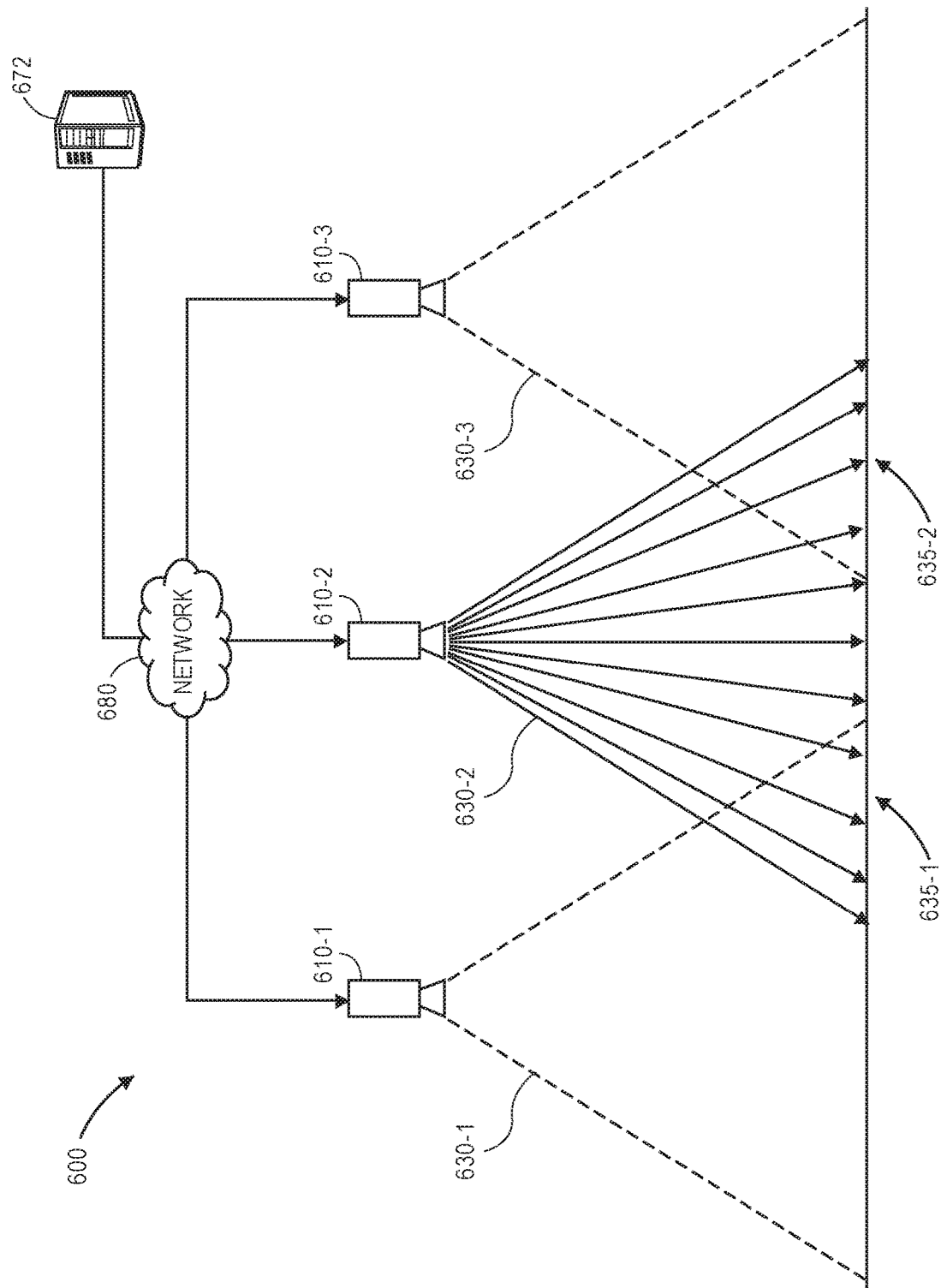
Figure 6E:
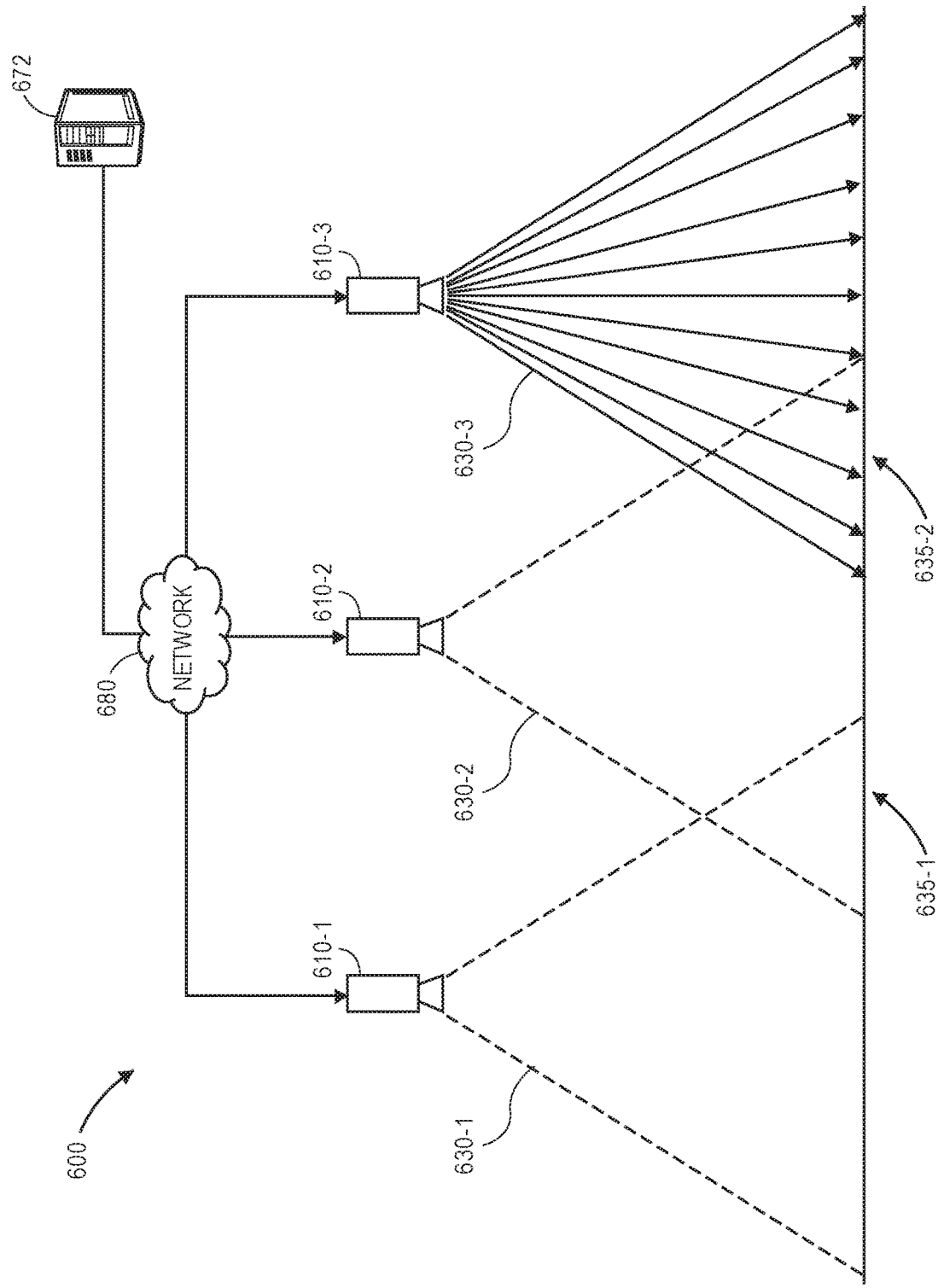

As is shown in FIG. 6D, the second time-of-flight camera 610-2 illuminates the second field of view 630-2 of the scene at a time determined based on the data record 640 and the detection of the illumination of the first region of interest 635-1, as is shown in FIG. 6C. The third time-of-flight camera 610-3 monitors at least a portion of the second field of view 630-2, including the second region of interest 635-2. In some embodiments, the third time-of-flight camera 610-3 may be programmed to determine whether light at any modulation frequency is reflected from surfaces within the second field of view 630-2 in general or the second region of interest 635-2 in particular. Alternatively, in some embodiments, the second time-of-flight camera 610-2 may be programmed to determine whether the third field of view 630-3 and/or the second region of interest 635-2 is illuminated with light having one or more properties designated in the data record 640, e.g., light having a wavelength of nine hundred eighty nanometers (980 nm), or light emitted at a modulation frequency of fifth megahertz (50 MHz).

Upon detecting the illumination of the second region of interest 635-2, the third time-of-flight camera 610-3 may determine a time at which the third time-of-flight camera 610-3 is to illuminate the third field of view 630-3, based on the data record 640. For example, as is shown in the data record 640 of FIG. 6B, the third time-of-flight camera 610-3 may be programmed to illuminate the third field of view 630-3 three hundred milliseconds (300 ms) after the second time-of-flight camera 610-2 illuminates the second field of view 630-2.

As is discussed above, the third time-of-flight camera 610-3 may be programmed to determine whether the entire third field of view 630-3 is illuminated or whether just the second region of interest 635-2 (or a portion thereof) is illuminated, e.g., by monitoring selected photoreceptors or photosensitive components of a sensor of the third time-of-flight camera 610-3 corresponding to the second region of interest 635-2. Additionally, in some embodiments, the third time-of-flight camera 610-3 may be programmed to determine whether light at any frequency or wavelength is reflected from surfaces within the third field of view 630-3 in general or the second region of interest 635-2 in particular. Alternatively, in some embodiments, the second time-of-flight camera 610-2 may be programmed to determine whether the third field of view 630-3 and/or the second region of interest 635-2 is illuminated with light having one or more properties designated in the data record 640, e.g., light having a wavelength of nine hundred ten nanometers (910 nm), or light emitted at a modulation frequency of fifteen megahertz (15 MHz).

Figure 7A:
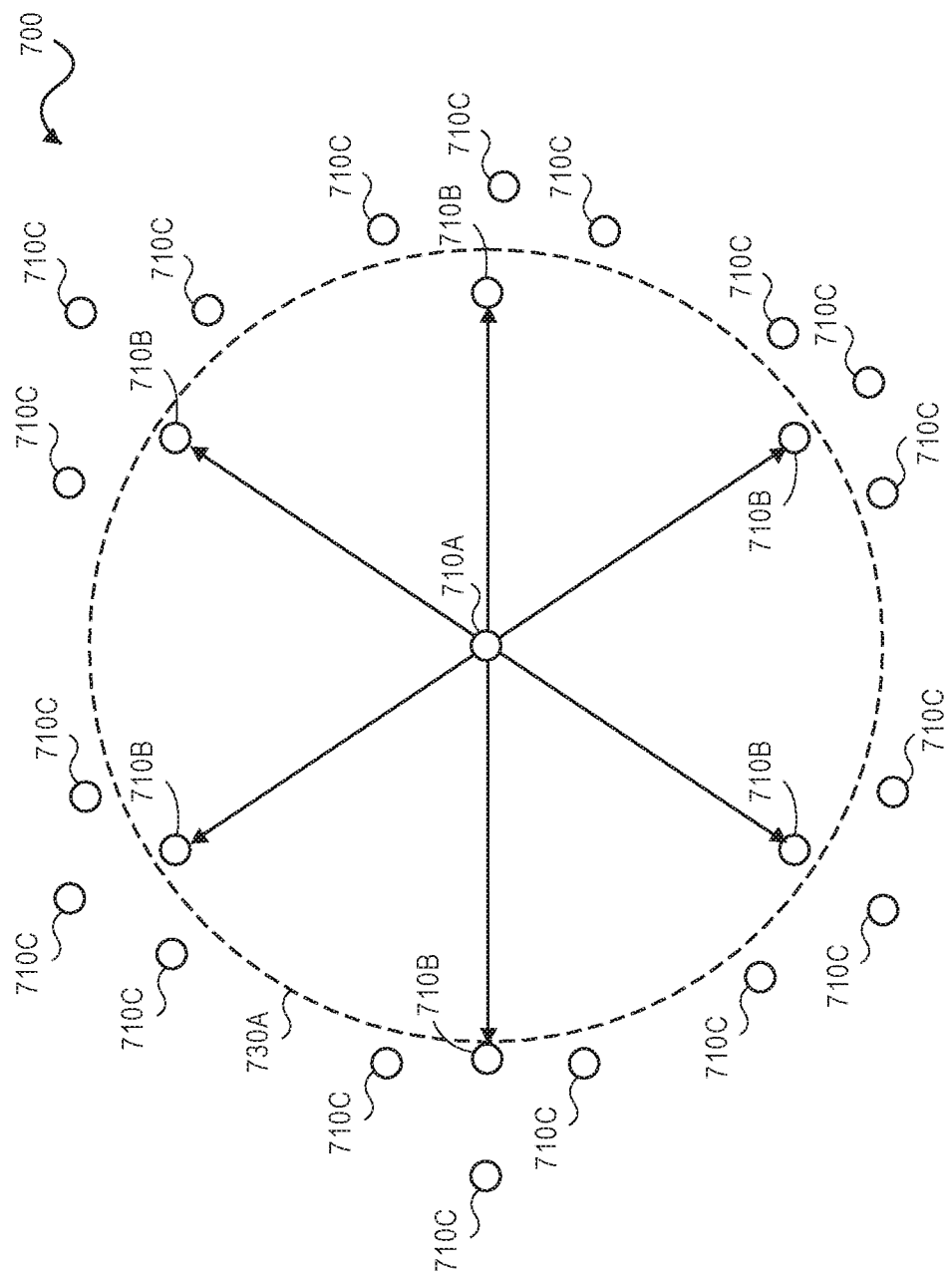
FIGS. 7A and 7B are views of aspects of one system for synchronizing time-of-flight cameras in accordance with embodiments of the present disclosure.
Figure 7B:
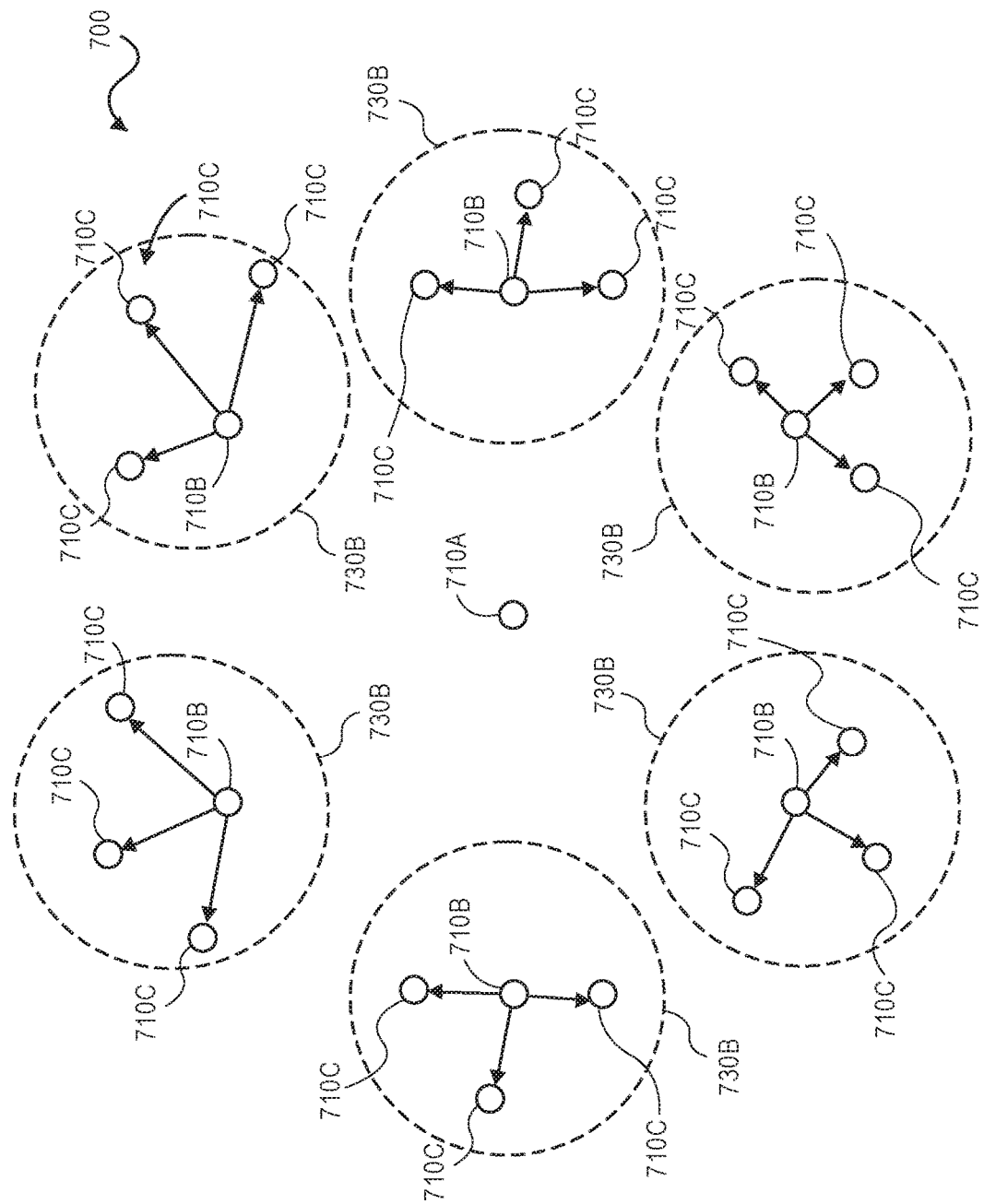

Accordingly, any number of time-of-flight cameras may be directly or indirectly synchronized to operate in accordance with a predetermined program, regardless of whether each of the time-of-flight cameras feature fields of view that overlap with one another. Referring to FIGS. 7A and 7B, views of aspects of one system for synchronizing time-of-flight cameras in accordance with embodiments of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

As is shown in FIGS. 7A and 7B, a system 700 includes twenty-five time-of-flight cameras 710A, 710B, 710C. In particular, the system 700 includes a primary time-of-flight camera 710A having a field of view that overlaps with fields of view of six secondary time-of-flight cameras 710B. Each of the six secondary time-of-flight cameras 710B has a field of view that overlaps with fields of view of three tertiary time-of-flight cameras 710C. Thus, as is shown in FIG. 7A, when the primary time-of-flight camera 710A illuminates a field of view that overlaps with the fields of view of the secondary time-of-flight cameras 710B, each of the secondary time-of-flight cameras 710B may detect the illumination and determine a time at which each of the secondary time-of-flight cameras 710B should illuminate their respective fields of view without conflicting with the illumination by the primary time-of-flight camera 710A.

Accordingly, as is shown in FIG. 7B, each of the secondary time-of-flight cameras 710B may illuminate their respective fields of view, and each of the tertiary time-of-flight cameras 710C may detect the illumination and determine a time at which each of the tertiary time-of-flight cameras 710C should illuminate their respective fields of view without conflicting with the illumination by the corresponding secondary time-of-flight camera 710B. Because the fields of view of the tertiary time-of-flight cameras 710C of different secondary time-of-flight cameras 710B do not overlap, the illumination intervals of some of the respective tertiary time-of-flight cameras 710C need not be coordinated with one another, however.

Figure 8:
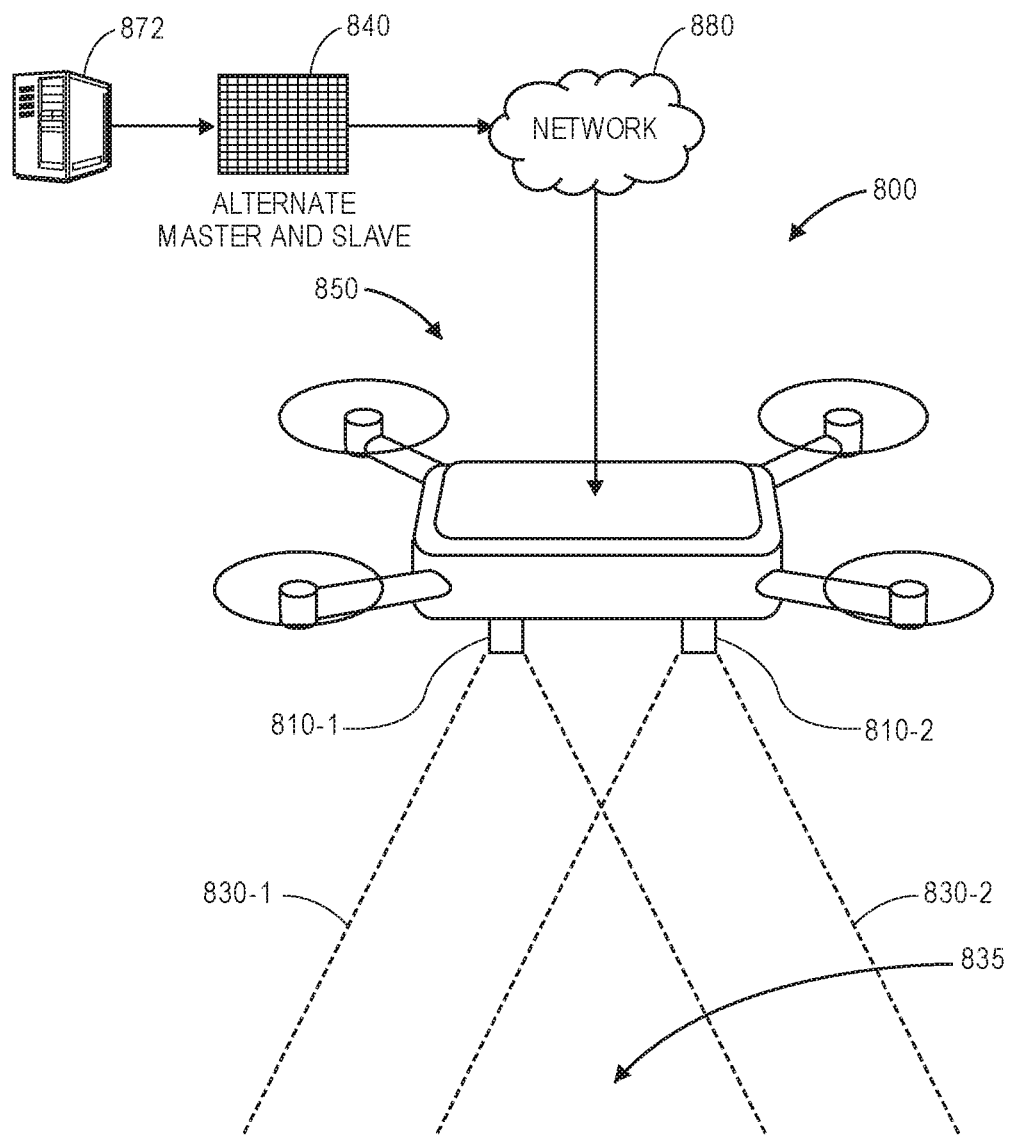
FIG. 8 is a view of aspects of one system for synchronizing time-of-flight cameras in accordance with embodiments of the present disclosure.

The systems and methods of the present disclosure may be utilized in any environment where two or more time-of-flight cameras may have overlapping fields of view, including where a vehicle or other system includes two or more of such time-of-flight cameras. Referring to FIG. 8, views of aspects of one system for synchronizing time-of-flight cameras in accordance with embodiments of the present disclosure are shown. Except where otherwise noted, reference numerals preceded by the number "8" shown in FIG. 8 indicate components or features that are similar to components or features having reference numerals preceded by the number "7" shown in FIGS. 7A and 7B, by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

As is shown in FIG. 8, a system 800 includes an aerial vehicle 850 and a server 872 connected to one another over a network 880, which may include the Internet in whole or in part. The aerial vehicle 850 includes a pair of time-of-flight cameras 810-1, 810-2 having fields of view 830-1, 830-2 that extend beneath the aerial vehicle 850, and overlap in a region of interest 835.

The server 872 may generate a data record 840 including specific times or slots at which each of the time-of-flight cameras 810-1, 810-2 are to illuminate a scene beneath the aerial vehicle 850, in an alternating fashion, and in order to avoid conflicting with one another, e.g., to avoid exposing a sensor of one of the time-of-flight camera 810-1, 810-2 as an illuminator of the other of the time-of-flight cameras 810-1, 810-2 is illuminating the scene. The data record 840 may designate one of the time-of-flight cameras 810-1, 810-2 as a master, and the other of the time-of-flight cameras 810-1, 810-2 as the slave. Alternatively, or additionally, the data record 840 may also include power levels, modulation frequencies, illumination wavelengths, illumination frequencies, or any other information or data regarding the operation of the time-of-flight cameras 810-1, 810-2 or the aerial vehicle 850.

Once the one or more of the time-of-flight cameras 810-1, 810-2 captures reflected light projected upon the scene by an illuminator by the other of the time-of-flight cameras 810-1, 810-2, the one of the cameras 810-1, 810-2 that captured the reflected light may project light upon the scene in a manner that does not conflict with the other of the time-of-flight cameras 810-1, 810-2. After the time-of-flight cameras 810-1, 810-2 are synchronized, the time-of-flight cameras 810-2 may independently operate to generate depth images or profiles of portions of the scene beneath the aerial vehicle 810.

Figure 9:
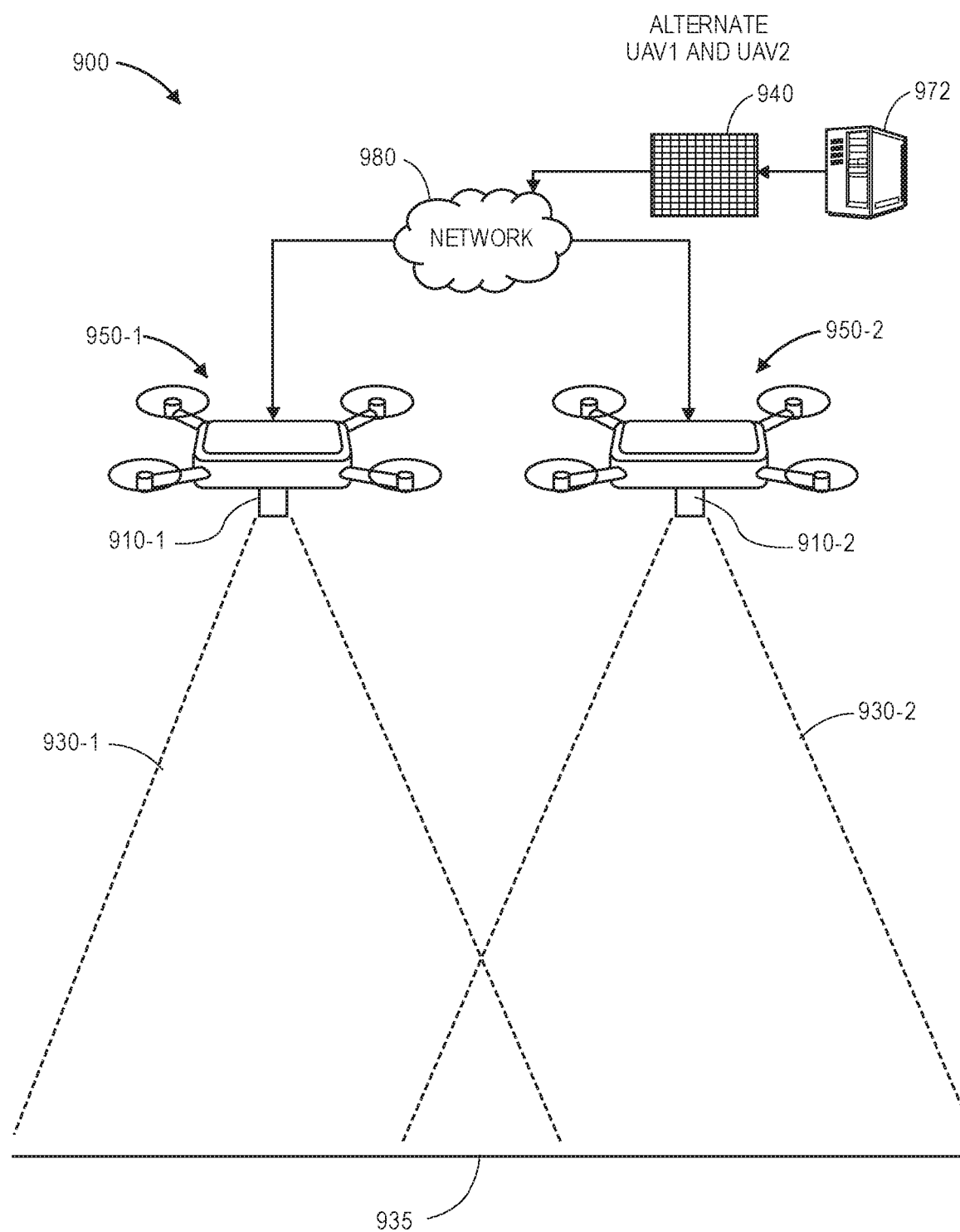
FIG. 9 is a view of aspects of one system for synchronizing time-of-flight cameras in accordance with embodiments of the present disclosure.

Similarly, the systems and methods of the present disclosure may be utilized in an environment where two or more vehicles (e.g., two or more unmanned aerial vehicles or autonomous mobile robots) have time-of-flight cameras with fields of view that overlap. Referring to FIG. 9, views of aspects of one system for synchronizing time-of-flight cameras in accordance with embodiments of the present disclosure are shown. Except where otherwise noted, reference numerals preceded by the number "9" shown in FIG. 9 indicate components or features that are similar to components or features having reference numerals preceded by the number "8" shown in FIG. 8, by the number "7" shown in FIGS. 7A and 7B, by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

As is shown in FIG. 9, a system 900 includes a pair of unmanned aerial vehicles 950-1, 950-2 and a server 972 that are connected to one another over a network 980, which may include the Internet in whole or in part. The unmanned aerial vehicles 950-1, 950-2 each feature a time-of-flight camera 910-1, 910-2 having a downward orientation, with a field of view 930-1, 930-2 that extend below the respective unmanned aerial vehicles 950-1, 950-2. The fields of view 930-1, 930-2 of the time-of-flight cameras 910-1, 910-2 may overlap in a region of interest 935 below the unmanned aerial vehicles 950-1, 950-2 when the unmanned aerial vehicles 950-1, 950-2 approach one another.

By programming the time-of-flight cameras 910-1, 910-2 of the aerial vehicles 950-1, 950-2 with times within repeated intervals at which each of such cameras 910-1, 910-2 may illuminate portions of the scene beneath the aerial vehicles 950-1, 950-2, the time-of-flight cameras 910-1, 910-2 may be independently programmed, e.g., by a data record 940 or other set of instructions, to operate in an alternating fashion to determine distances to objects (e.g., ground-based features) beneath the respective aerial vehicles 950-1, 950-2. For example, the time-of-flight cameras 910-1, 910-2 may be programmed to monitor photoreceptors or other photosensitive components of the time-of-flight cameras 910-1, 910-2 to detect reflected light at any wavelength or frequency, or at select wavelengths or frequencies (e.g., infrared wavelengths or frequencies) and upon detecting the reflected light, to begin illuminating portions of the scene beneath the respective aerial vehicles 950-1, 950-2 in a manner that does not conflict with one another.

Figure 10:
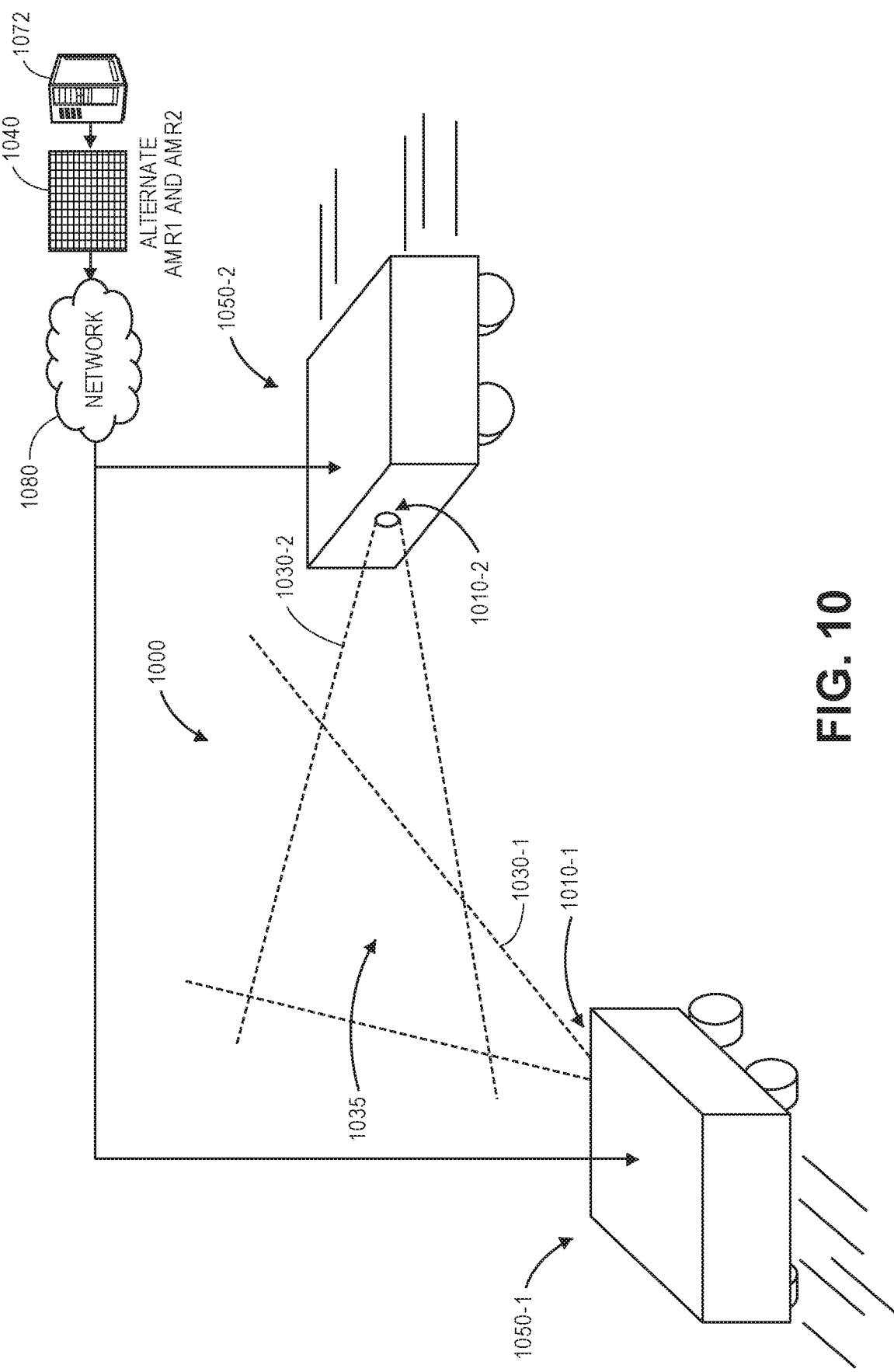
FIG. 10 is a view of aspects of one system for synchronizing time-of-flight cameras in accordance with embodiments of the present disclosure.

Similarly, one or more embodiments of the present disclosure may also be utilized to synchronize time-of-flight cameras operating on ground-based vehicles, such as one or more autonomous mobile robots. Referring to FIG. 10, views of aspects of one system for synchronizing time-of-flight cameras in accordance with embodiments of the present disclosure are shown. Except where otherwise noted, reference numerals preceded by the number "10" shown in FIG. 10 indicate components or features that are similar to components or features having reference numerals preceded by the number "9" shown in FIG. 9, by the number "8" shown in FIG. 8, by the number "7" shown in FIGS. 7A and 7B, by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

As is shown in FIG. 10, a system 1000 includes a pair of autonomous mobile robots 1050-1, 1050-2 and a server 1072 that are connected to one another over a network 1080, which may include the Internet in whole or in part. The autonomous mobile robots 1050-1, 1050-2 each feature a time-of-flight camera 1010-1, 1010-2 having a forward and/or lateral orientation, with a field of view 1030-1, 1030-2 that extend in one or more directions around the autonomous mobile robots 1050-1, 1050-2. The fields of view 1030-1, 1030-2 of the time-of-flight cameras 1010-1, 1010-2 may overlap in a region of interest 1035 when the unmanned aerial vehicles 1050-1, 1050-2 approach one another.

By programming the time-of-flight cameras 1010-1, 1010-2 of the autonomous mobile robots 1050-1, 1050-2 with times within repeated intervals at which each of such cameras 1010-1, 1010-2 may illuminate portions of the scenes forward or around the autonomous mobile robots 1050-1, 1050-2, the time-of-flight cameras 1010-1, 1010-2 may be independently programmed, e.g., by a data record 1040 or other set of instructions, to operate in an alternating fashion to determine distances to objects (e.g., ground-based features) beneath the respective aerial vehicles 1010-1, 1010-2. For example, the time-of-flight cameras 1010-1, 1010-2 may be programmed to selectively monitor photoreceptors or other photosensitive components of the time-of-flight cameras 1010-1, 1010-2 to detect reflected light at any wavelength or frequency, or at select wavelengths or frequencies (e.g., infrared wavelengths or frequencies) and upon detecting the reflected light, to begin illuminating portions of the scene forward or around the autonomous mobile robots 1050-1, 1050-2 in a manner that does not conflict with one another.

Figure 11:
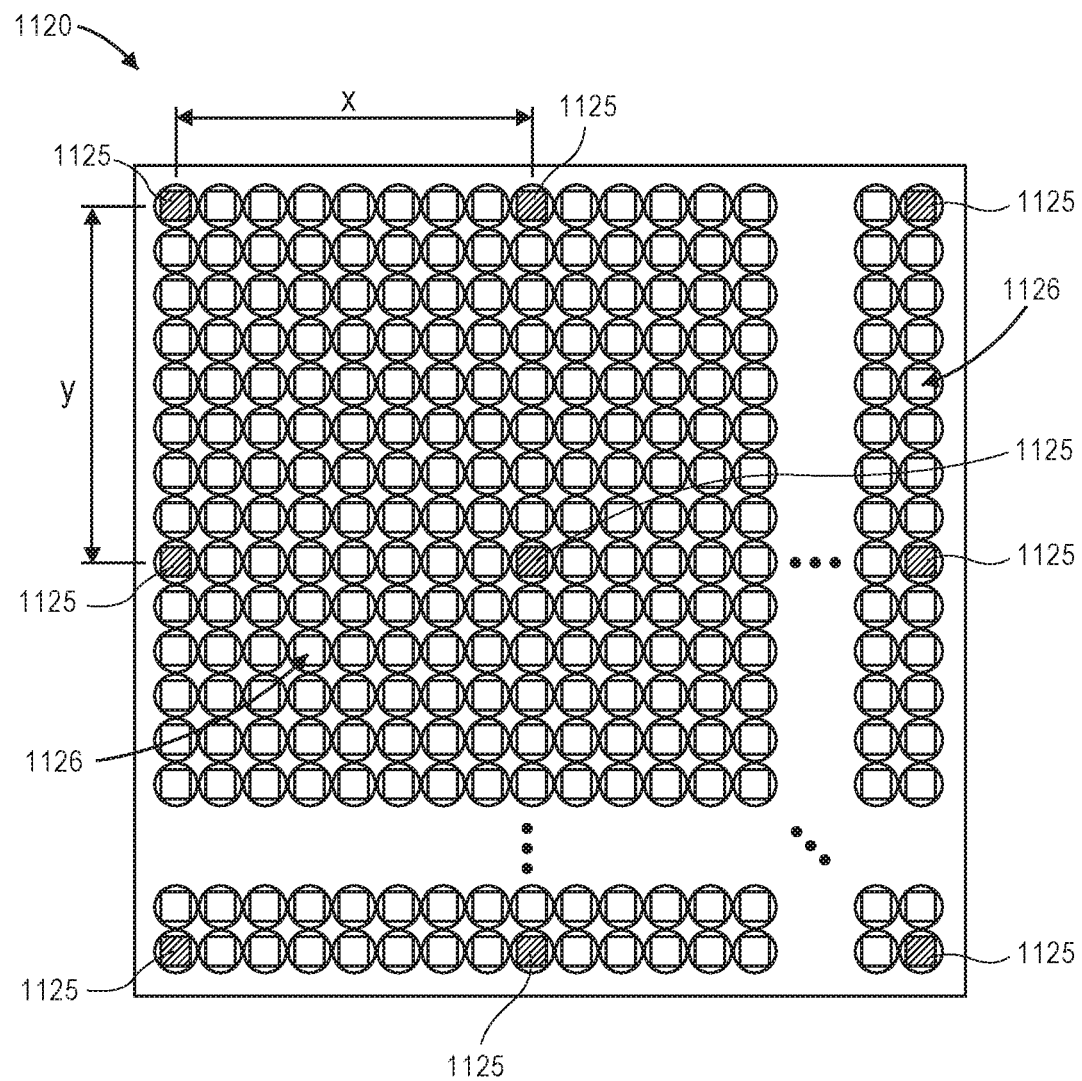
FIG. 11 is a view of one imaging sensor for detecting interference between time-of-flight cameras.

As is discussed above, a time-of-flight camera may be equipped with an image sensor array that has been modified to include a plurality of modulated light sensors distributed throughout the image sensor array. Referring to FIG. 11, a view of one imaging sensor in accordance with embodiments of the present disclosure is shown. Except where otherwise noted, reference numerals preceded by the number "11" shown in FIG. 11 indicate components or features that are similar to components or features having reference numerals preceded by the number "10" shown in FIG. 10, by the number "9" shown in FIG. 9, by the number "8" shown in FIG. 8, by the number "7" shown in FIGS. 7A and 7B, by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

As is shown in FIG. 11, an imaging sensor 1120 includes a plurality of pixel sensors 1126 distributed in an array. The imaging sensor 1120 may be any type or form of imaging sensor, e.g., a CMOS sensor of a photonic mixer device, and the pixel sensors 1126 may be one or more photodetectors or photosensitive components. Additionally, the imaging sensor 1120 further includes a plurality of modulated light sensors 1125 interspersed at discrete locations within the pixel sensors 1126. For example, as is shown in FIG. 11, the modulated light sensors 1125 are installed within the imaging sensor 1120 in place of pixel sensors, and are distributed in a regular manner, in discrete locations of the array that are separated at intervals of y pixel sensors along a vertical axis and x pixel sensors along a horizontal axis.

In accordance with some embodiments of the present disclosure, the image sensor 1120 may include any number of timing circuits, modulation generators, analog-to-digital converters, readout logic, amplifiers or other components. For example, in some embodiments, the modulated light sensors 1125 and the pixel sensors 1126 may be operated by the same set of timing circuits and/or logic, or by different sets of timing circuits or readout logic. Moreover, readout logic for interpreting times at which modulated light is sensed by the modulated light sensors 1125 may also detect modulation frequencies and/or wavelengths of the modulated light, as well.

Where a number of the modulated light sensors 1125 is significantly smaller than a number of the pixel sensors 1126, such as is shown in FIG. 11, the modulated light sensors 1125 may be interpreted at a greater rate than the pixel sensors 1126, thereby enabling the image sensor 1120 to determine a time at which another time-of-flight camera (not shown) illuminated all or a portion of the image sensor 1120 to an adequate degree of precision. For example, in some embodiments, the modulated light sensors 1125 may be read as many as one thousand times per second, providing millisecond-level accuracy in determining times at which other time-of-flight cameras have illuminated the image sensor 1120, thereby enabling a time slot at which such other time-of-flight cameras are not illuminating the image sensor 1120 to be determined with greater precision, as well.

Each of the modulated light sensors 1125 may include one or more lenses or lens assemblies for mapping the fields of view of the modulated light sensors 1125 to the imaging sensor 1120. The modulated light sensors 1125 may thus detect the presence of modulated light within a field of view of an imaging device within which the imaging sensor 1120 is installed, as well as modulation frequencies and times at which the modulated light is present. Moreover, a number of the modulated light sensors 1125, or the intervals y and x at which such modulated light sensors 1125 are distributed, as shown in FIG. 11, may be selected in order to ensure that depth resolution of imaging data captured using the pixel sensors 1126 of the image sensor 1120 are sufficiently high while also enabling the image sensor 1120 to also capture information or data regarding modulated light from other time-of-flight cameras that are causing depth interference within the imaging data.

Figure 12:
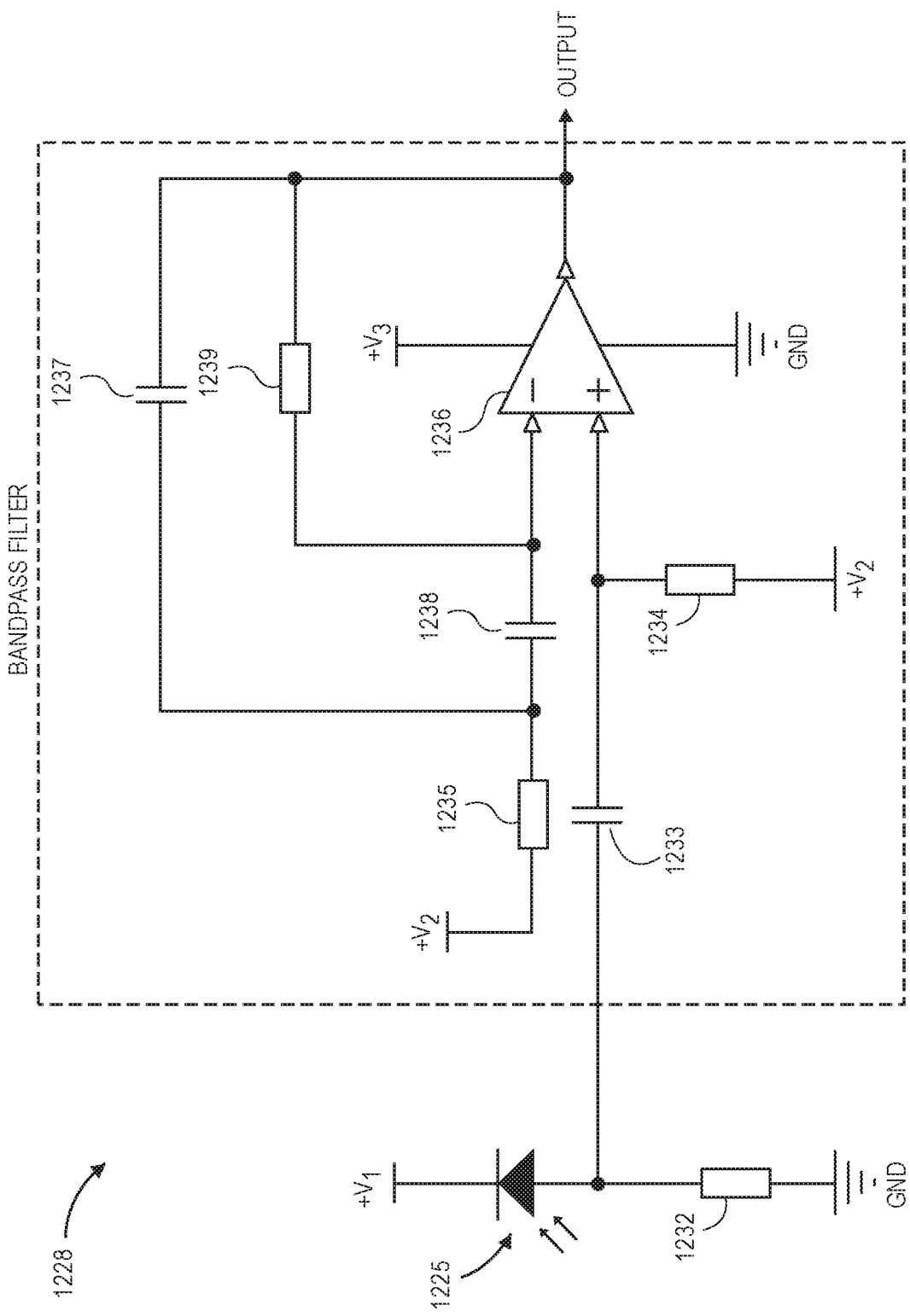
FIG. 12 is a view of one circuit for detecting interference between time-of-flight cameras in accordance with embodiments of the present disclosure.

Each of the modulated light sensors distributed within an image sensor array may be coupled to a transimpedance amplifier circuit, a bandpass filter circuit or another circuit. Referring to FIG. 12, a view of one circuit for detecting interference between time-of-flight cameras in accordance with embodiments of the present disclosure is shown. Except where otherwise noted, reference numerals preceded by the number "12" shown in FIG. 12 indicate components or features that are similar to components or features having reference numerals preceded by the number "11" shown in FIG. 11, by the number "10" shown in FIG. 10, by the number "9" shown in FIG. 9, by the number "8" shown in FIG. 8, by the number "7" shown in FIGS. 7A and 7B, by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

As is shown in FIG. 12, a photodiode 1225 is provided in series with a bandpass filter circuit (or a transimpedance amplifier circuit) 1228. The bandpass filter circuit 1228 is provided to convert illumination changes, e.g., as sensed by the photodiode 1225, to output voltage signals and to suppress frequencies of modulated light that lie outside of a predetermined band, and includes an operational amplifier 1236. In accordance with some embodiments of the present disclosure, a bandpass filter circuit, a transimpedance amplifier circuit, or any other circuit, such as the bandpass filter circuit 1228 of FIG. 12, may be provided in connection with each of the modified pixel sensors in an image sensor array, e.g., to modify such pixel sensors for use in detecting modulated light.

The photodiode 1225 may be a semiconductor or other diode embedded within an image sensor array, e.g., in one of the modulated light sensors 1125 of the image sensor 1120 shown in FIG. 11. The photodiode 1225 is configured to convert photons to electrons or gaps that induce a leakage current to flow from a voltage source $V_1$ across resistor 1232, which is reverse-biased, proportionate to an intensity of light contacting the photodiode 1225. For example, the current across the resistor 1232 fluctuates in proportion with the modulated light cast upon the photodiode 1225 and the image sensor array in which the photodiode 1225 is embedded. The fluctuating current across the resistor 1232 thus induces a fluctuating voltage across the resistor 1232.

As is shown in FIG. 12, the bandpass filter circuit 1228 further includes a high-pass filter formed by capacitor 1233 and resistor 1234, which ensure that constant illumination acting upon the photodiode 1225, which results in constant and not fluctuating current flows across the resistor 1232, does not have any effect upon an input to the operational amplifier 1236 or an output therefrom.

As is also shown in FIG. 12, resistor 1235, capacitor 1237, capacitor 1238 and resistor 1239 form a feedback divider for the operational amplifier 1236, including a low-pass and a high-pass stage. Frequencies at which such components operate may be defined by resistances and/or capacitances of the respective components. Modulated light having frequencies above and below cut-off frequencies of the respective high-pass and low-pass filters are attenuated by the bandpass filter circuit 1228, while modulation frequencies between the cut-off frequencies are amplified to levels that ensures that a readout of a modulated light sensor may detect such pulses. The operational amplifier 1236 is configured to generate outputs representative of frequencies of modulated light sensed by the photodiode 1225 and/or times at which the modulated light is sensed by the photodiode 1225. For example, a readout component may determine and record not only modulation frequencies but also whether a signal is present or absent. Information or data regarding such frequencies, or the presence or absence of such modulated light, may be stored in one or more memory components or data stores, as appropriate, and utilized for any purpose.

The bandpass filter circuit 1228 is just one example of a circuit that may be utilized in connection with a modulated light sensor embedded within an image sensor array, e.g., to detect the presence of modulated light thereon or to determine a frequency of the modulated light, in accordance with the present disclosure.

An image sensor array, such as the image sensor array 1120 of FIG. 11 that has been modified to include a plurality of modulated light sensors or other modified pixel sensors may be used to detect the presence of interfering light within a field of view of a time-of-flight camera and to use attributes of the interfering light to select one or more times or intervals at which the time-of-flight camera may safely operate and during which interfering light is not present. Referring to FIG. 13A through 13E, views of aspects of one system for detecting interference between time-of-flight cameras in accordance with embodiments of the present disclosure are shown. Except where otherwise noted, reference numerals preceded by the number "13" shown in FIGS. 13A through 13E indicate components or features that are similar to components or features having reference numerals preceded by the number "12" shown in FIG. 12, by the number "11" shown in FIG. 11, by the number "10" shown in FIG. 10, by the number "9" shown in FIG. 9, by the number "8" shown in FIG. 8, by the number "7" shown in FIGS. 7A and 7B, by the number "6" shown in FIGS. 6A through 6E, by the number "5" shown in FIG. 5, by the number "4" shown in FIGS. 4A through 4E, by the number "2" shown in FIG. 2A or FIG. 2B, or by the number "1" shown in FIGS. 1A through 1F.

Figure 13A:
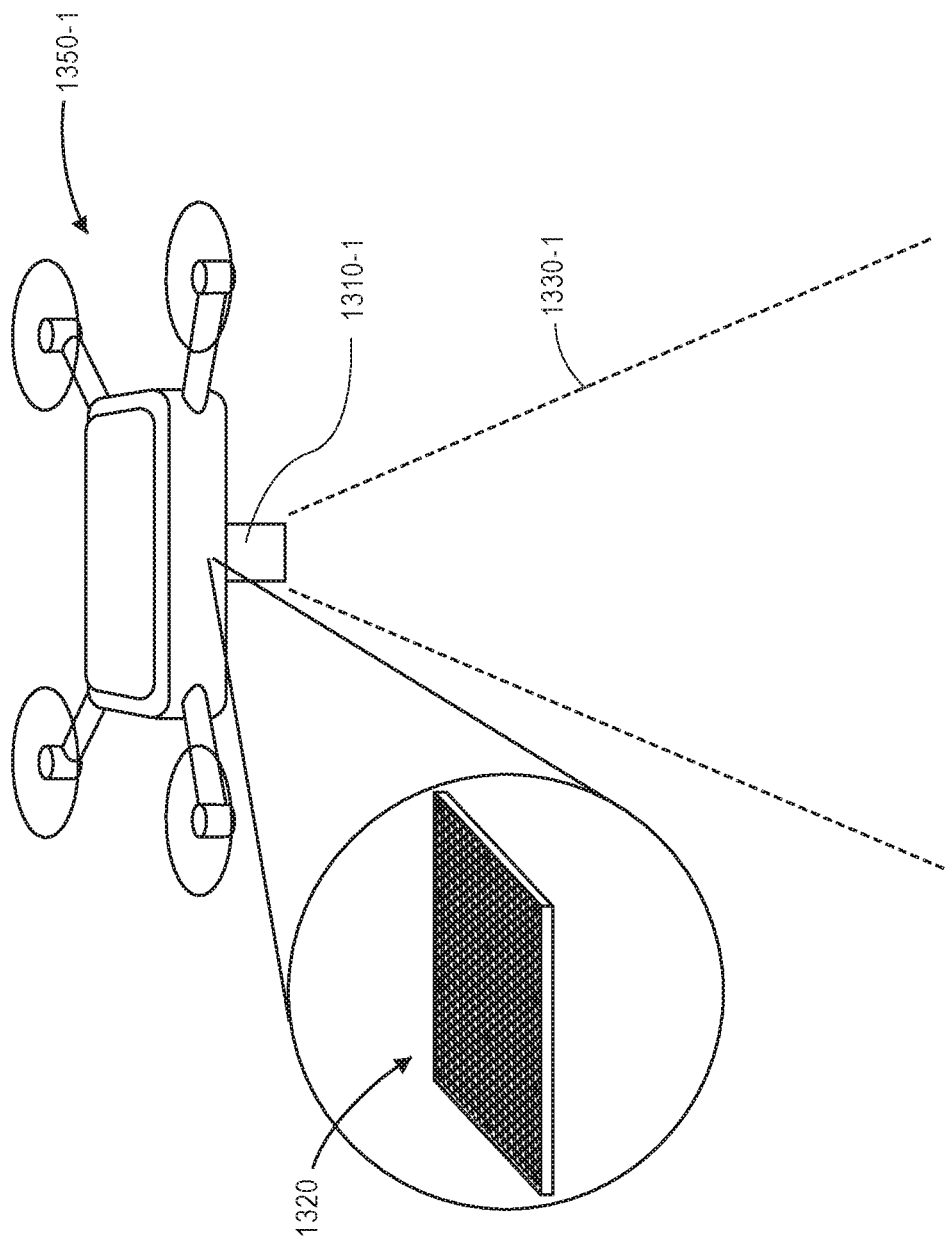
FIGS. 13A through 13E are views of aspects of one system for detecting interference between time-of-flight cameras in accordance with embodiments of the present disclosure.

As is shown in FIG. 13A, an aerial vehicle 1350-1 includes a time-of-flight camera 1310-1 having a downward orientation, with a field of view 1330-1 that extends below the aerial vehicle 1350-1. The time-of-flight camera 1310-1 includes an imaging sensor 1320 that has been modified to include one or more modulated light sensors distributed in a regular manner throughout an image sensor array, e.g., a CMOS sensor. The time-of-flight camera 1310-1 may be programmed to illuminate portions of a scene within the field of view 1330-1 at selected times, e.g., at specific times within repeated intervals, in order to determine distances to objects (e.g., ground-based features) beneath the aerial vehicle 1350-1. For example, the time-of-flight camera 1310-1 may be programmed to illuminate such portions at select wavelengths or frequencies (e.g., infrared wavelengths or frequencies) and to monitor photoreceptors or other photosensitive components of the time-of-flight camera 1310-1 to detect reflected light at any wavelength or frequency.

Figure 13B:
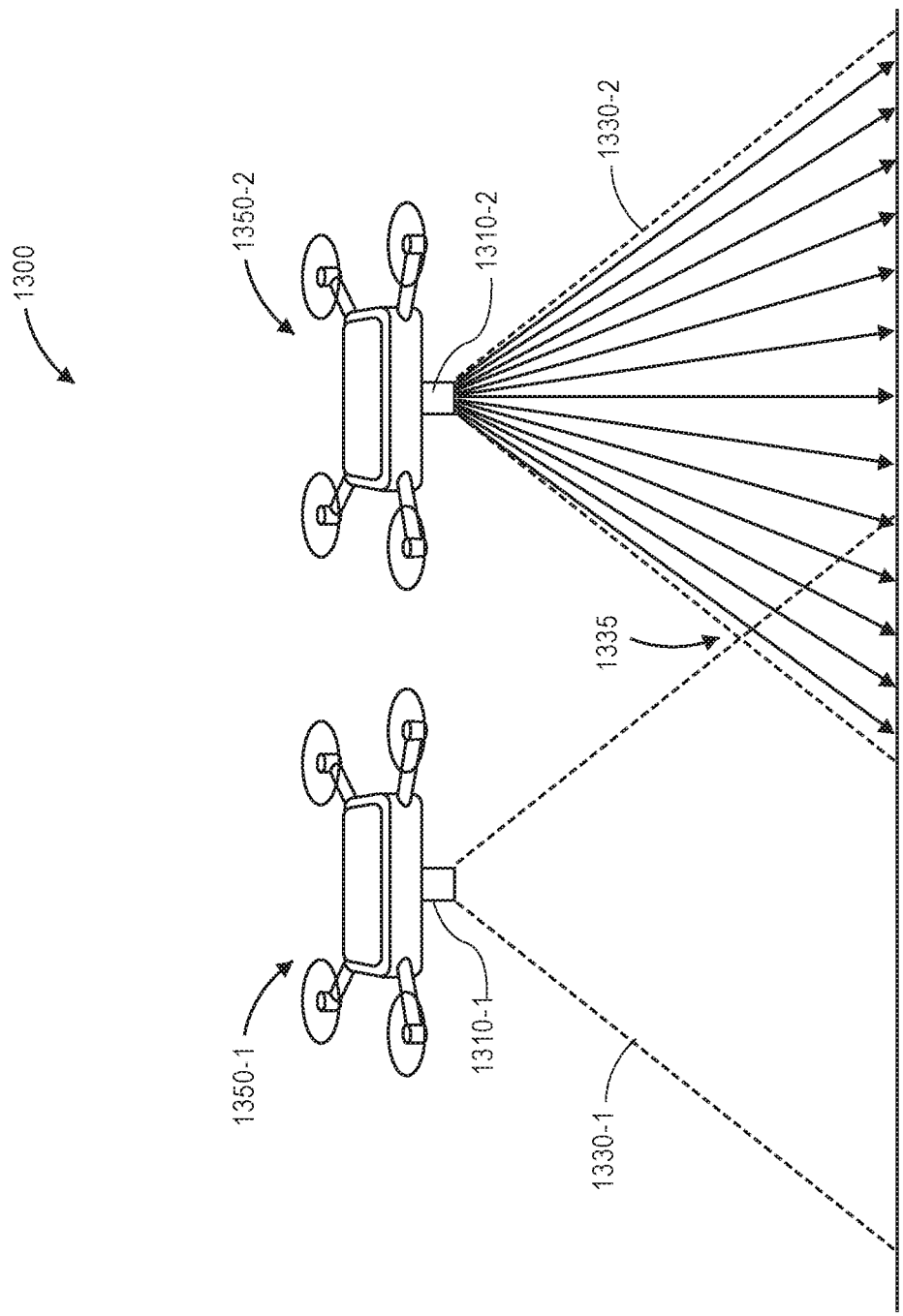

As is shown in FIG. 13B, when a time-of-flight camera 1310-2 of another aerial vehicle 1350-2 having a field of view 1330-2 that overlaps with the field of view 1330-1 at an area of interest 1335 that illuminates a portion of the scene that includes the area of interest 1335, the time-of-flight camera 1310-2 captures light reflected from portions of the scene within the field of view 1330-2, regardless of the source. Alternatively, the aerial vehicle 1350-1 and/or the aerial vehicle 1350-2 may be in communication with one or more servers or other computer systems over a network (not shown), which may include the Internet in whole or in part. Such servers or other systems may have one or more records of modulation frequencies, wavelengths, times or intervals at which one or more time-of-flight cameras, viz., the time-of-flight cameras 1310-1, 1310-2, are programmed to illuminate their respective fields of view.

Figure 13C:
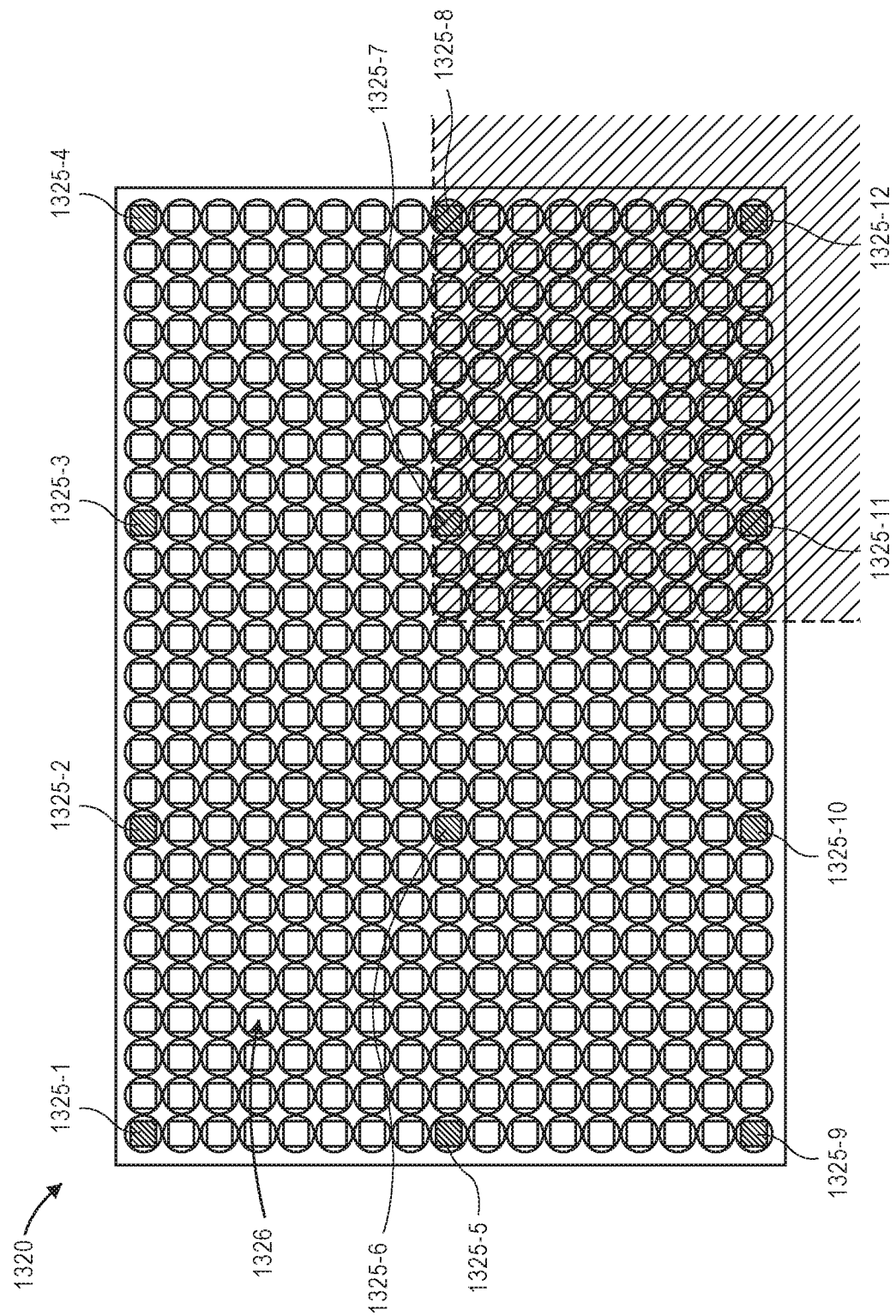

As is shown in FIG. 13C, the imaging sensor 1320 comprises an array having a plurality of locations, with a plurality of modulated light sensors 1325-1, 1325-2, 1325-3, 1325-4, 1325-5, 1325-6, 1325-7, 1325-8, 1325-9, 1325-10, 1325-11, 1325-12 dispersed in locations among a plurality of pixel sensors 1326 that are distributed in a regular manner. The imaging sensor 1320 may be any type or form of imaging sensor, e.g., a CMOS sensor of a photonic mixer device, and the pixel sensors 1326 may be one or more photodetectors or photosensitive components. The modulated light sensors 1325-1, 1325-2, 1325-3, 1325-4, 1325-5, 1325-6, 1325-7, 1325-8, 1325-9, 1325-10, 1325-11, 1325-12 are installed within the imaging sensor 1320 in place of pixel sensors, and distributed at regular intervals along a vertical axis and a horizontal axis of the imaging sensor 1320.

As further is shown in FIG. 13C, depth interference between the time-of-flight cameras 1310-1, 1310-2 is detected by the imaging sensor 1320. In particular, the modulated light sensors 1325-7, 1325-8, 1325-11, 1325-12 detect modulated light from the time-of-flight camera 1310-2 of the aerial vehicle 1350-2, due to the illumination of the field of view 1330-2, which overlaps with the field of view 1330-1 at the area of interest 1335. The modulated light sensors 1325-7, 1325-8, 1325-11, 1325-12 may determine not only times and/or modulation frequencies at which the time-of-flight camera 1310-2 illuminated the area of interest 1335 but also wavelengths of the modulated light, or any other information or data regarding the modulated light.

Figure 13D:
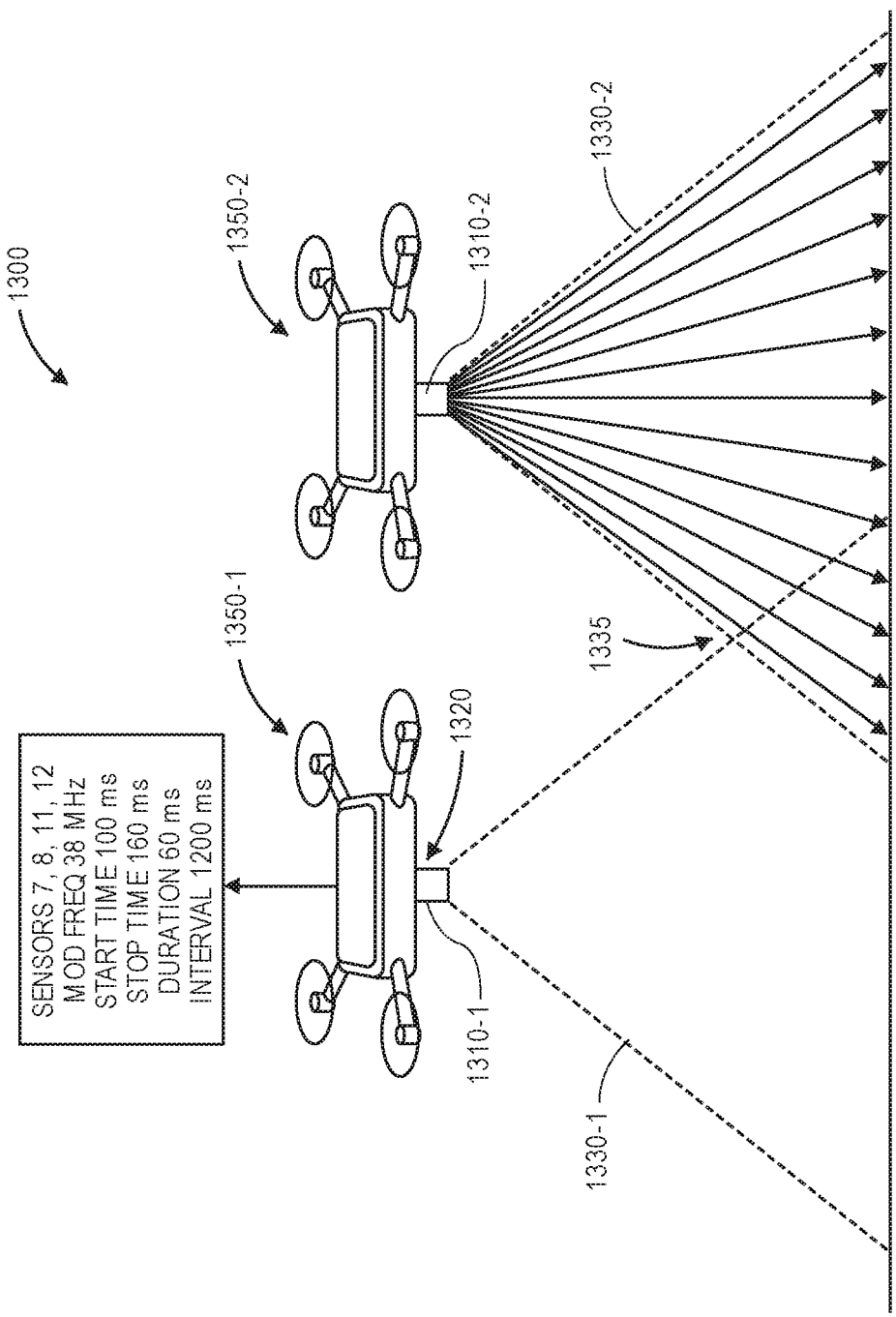

As is shown in FIG. 13D, the aerial vehicle 1350-1 reports the information or data regarding the modulated light captured by the modulated light sensors 1325-7, 1325-8, 1325-11, 1325-12 to the server 1372 over the network 1380. For example, the information or data reported by the modulated light sensors 1325-7, 1325-8, 1325-11, 1325-12 may include numbers or locations of the modulated light sensors 1325-7, 1325-8, 1325-11, 1325-12 within the image sensor 1320 that captured the modulated light, as well as a modulation frequency of the modulated light, times at which the emission of the modulated light began and ended, a duration of one or more pulses of the modulated light, and an interval at which emissions or pulses of the modulated light are repeated. For example, as is shown in FIG. 13D, the aerial vehicle 1350-1 detects that the modulated light has a frequency of thirty-eight megahertz (38 MHz), and that the modulated light was detected between one hundred milliseconds (100 ms) and one hundred sixty milliseconds (160 ms) of a repeated twelve hundred millisecond (1200 ms) interval, or for a duration of sixty milliseconds (60 ms). Alternatively, the aerial vehicle 1350-1 may then compare the information or data reported by the modulated light sensors 1325-7, 1325-8, 1325-11, 1325-12 to information or data maintained in one or more records, e.g., aboard the aerial vehicle 1350-1, or in one or more external locations. Such records may identify one or more other time-of-flight cameras or aerial vehicles associated with such time-of-flight cameras that are programmed or otherwise configured to illuminate their respective fields of view at such modulation frequencies, at such times, for such durations or at such intervals.

Figure 13E:
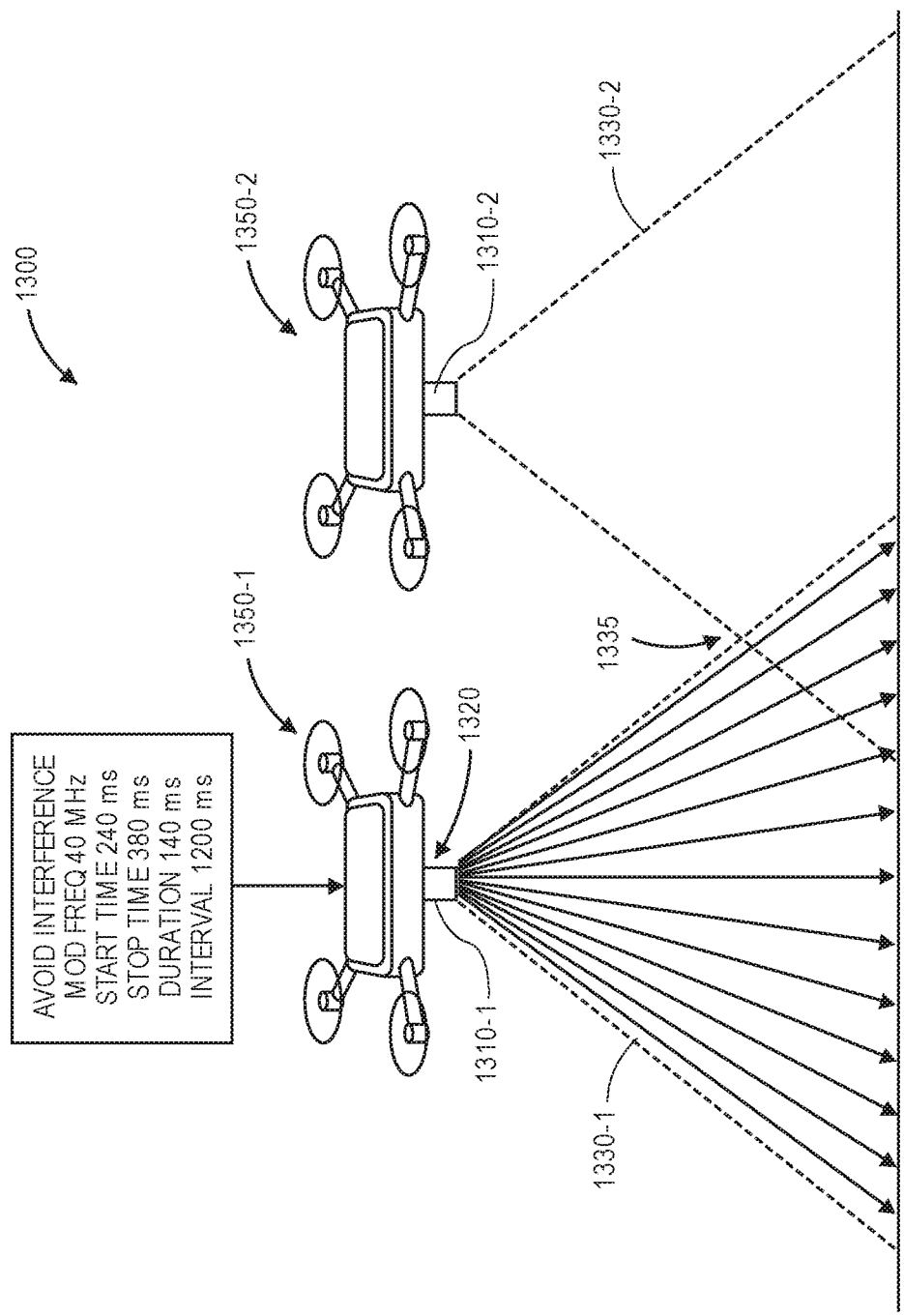

As is shown in FIG. 13E, the aerial vehicle 1310-1 selects one or more modulation frequencies or times for operating the time-of-flight camera 1310-1 in order to avoid depth interference with the time-of-flight camera 1310-2. For example, as is shown in FIG. 13E, in order to avoid interference with the time-of-flight camera 1310-2 or the aerial vehicle 1350-2, the aerial vehicle 1350-1 selects a modulation frequency of forty megahertz (40 MHz), as well as a start time of two hundred forty milliseconds (240 ms) and three hundred eighty milliseconds (380 ms), for a duration of one hundred forty milliseconds (140 ms) of the repeated interval of twelve hundred milliseconds (1200 ms), and begins to illuminate the field of view 1330-1 with the modulated light in a manner that does not result in depth interference at the area of interest 1335.

Figure 14:
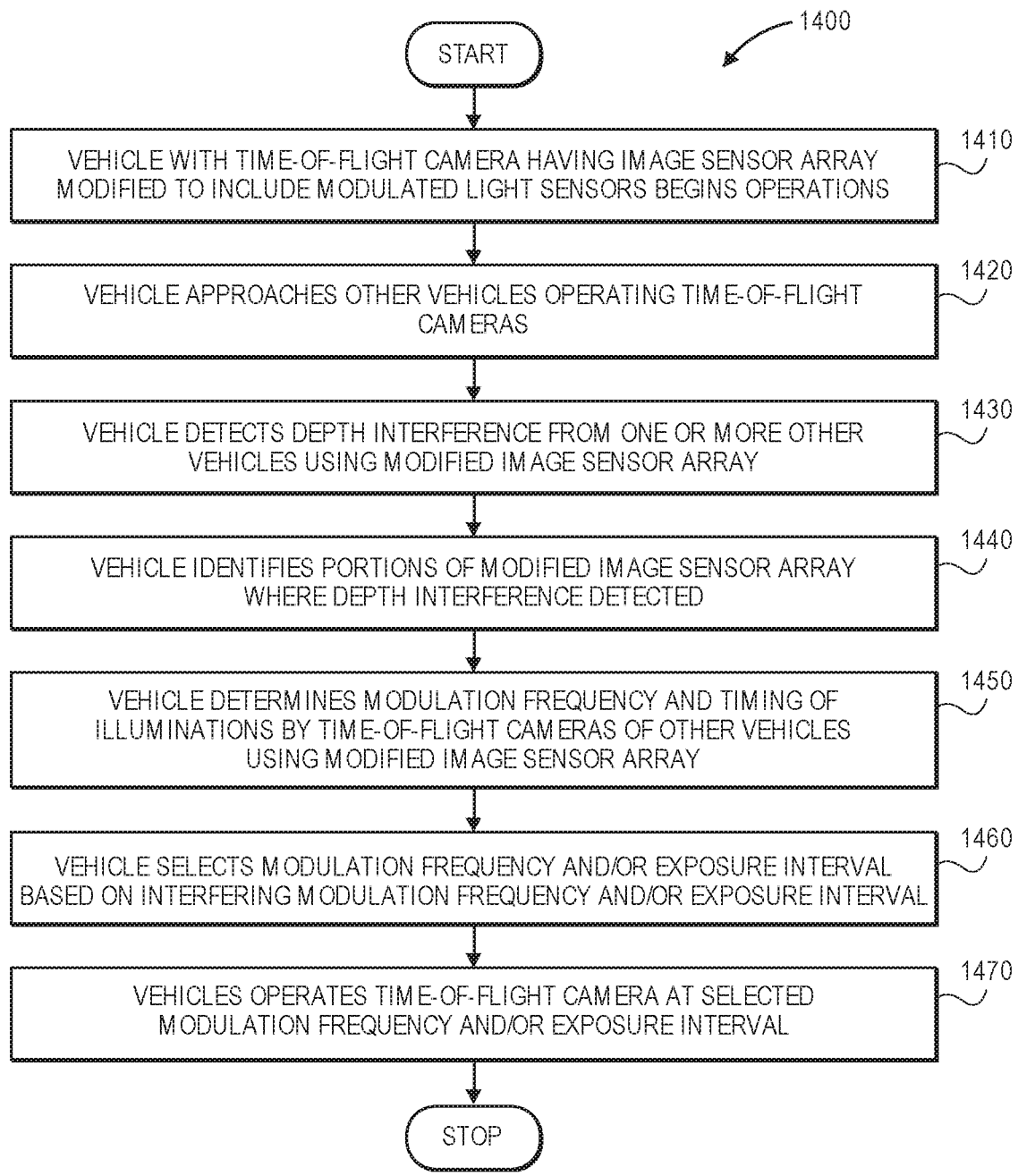
FIG. 14 is a flow chart of one process for detecting interference between time-of-flight cameras in accordance with embodiments of the present disclosure.

Referring to FIG. 14, a flow chart 1400 of one process for detecting interference between time-of-flight cameras in accordance with embodiments of the present disclosure is shown. At box 1410, a vehicle having a time-of-flight camera with an image sensor array that has been modified to include one or more modulated light sensors begins operations. For example, the image sensor array may be modified to include a plurality of photodiodes or other sensors distributed throughout the image sensor array that are configured to sense when the sensors are exposed to light of various wavelengths at various modulation frequencies for various durations. In some embodiments, the vehicle may be an aerial vehicle, a land-based vehicle (e.g., an automobile), a sea-going vessel, and may be manned or unmanned. The vehicle may be outfitted with any number of time-of-flight cameras having fields of view that are aligned at any angles or in any orientations with respect to the vehicle, along with any number of other sensors, e.g., visual imaging devices (such as grayscale or color cameras).

At box 1420, the vehicle approaches one or more other vehicles that are also operating one or more time-of-flight cameras, at any velocity or altitude. Alternatively, the vehicle may be traveling at a comparatively low velocity or stationary, e.g., fixed in position, such as hovering or stopped, and may be approached by the one or more time-of-flight cameras. At box 1430, the vehicle detects depth interference from one or more of the other vehicles using its modified sensor array. For example, when the vehicle and the one or more other vehicles are within a vicinity of one another, with fields of view of their corresponding time-of-flight cameras overlapping at least in part, time-of-flight cameras aboard one or more of the other vehicles may illuminate their respective fields of view at a desired modulation frequency or within a specified time slot, as the time-of-flight camera aboard the vehicle has exposed its image sensor array.

The other vehicles may be programmed to illuminate their respective fields of view at a repeated interval of a standard duration of time (e.g., one hundred milliseconds, five hundred milliseconds), and the time-of-flight cameras may be programmed to illuminate their respective fields of view for discrete durations within the repeated interval, e.g., for fractions of the repeated interval, such as fractions of one second within one second. The time-of-flight cameras aboard one or more of the other vehicles may be programmed to illuminate their respective fields of view at selected power levels, modulation frequencies, or illumination wavelengths or frequencies, and the time-of-flight camera aboard the vehicle may be programmed to expose the image sensor array at selected times or within selected intervals.

At box 1440, the vehicle identifies portions of the modified image sensor array that detected the depth interference. For example, where an image sensor array is modified to include a plurality of photodiodes, the individual photodiodes on the image sensor array that sensed the illumination may be identified. At box 1450, the vehicle determines a modulation frequency and timing of illuminations by the time-of-flight cameras of the other vehicles using the modified image sensor array. For example, the one or more photodiodes may sense such modulation frequencies, wavelengths, times or intervals of each of the time-of-flight cameras having fields of view that overlap with the time-of-flight camera having the modified image sensor array. In some embodiments, each of the aerial vehicles may be outfitted or equipped with an image sensor array that has been modified to include one or more photodiodes, and the vehicles may independently evaluate modulated light detected by each of their respective time-of-flight cameras.

At box 1460, the vehicle selects a modulation frequency and/or an exposure interval that would enable the vehicle to avoid depth interference with the one or more other vehicles based on the modulation frequencies and/or exposure intervals of the other vehicles as determined at box 1450. For example, the vehicle may select a time slot within an exposure interval of the other vehicles identified using the photodiodes, as well as a modulation frequency for illuminating its field of view within the time slot, without causing depth interference with such other vehicles. In some embodiments, the vehicle may identify the one or more other vehicles associated with the depth interference based on the portions of the modified image sensor array that detected the modulated light, the modulation frequency and/or the timing of the illuminations by such vehicles, e.g., the times at which the modulated light was projected upon the scene or the intervals at which such illumination are repeated.

At box 1470, the vehicle operates its time-of-flight camera at the selected modulation frequency and/or exposure interval and the process ends.

Although some of the embodiments disclosed herein reference the use of time-of-flight cameras in fulfillment centers or like environments, or aboard autonomous mobile robots or unmanned aerial vehicles, those of ordinary skill in the pertinent arts will recognize that the systems and methods disclosed herein are not so limited, and may be utilized in connection with time-of-flight cameras that are provided with overlapping fields of view for any intended industrial, commercial, recreational or other use. Additionally, although some of the embodiments shown here depict the illumination of scenes by and/or the exposure of time-of-flight cameras at illumination intervals and exposure intervals that occur within repeated intervals of one second, the illuminations and/or exposures of the present disclosure may occur at any time and for any duration with respect to one another, or within repeated intervals of any duration in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3 or 14, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
a first time-of-flight camera having a first illuminator and a first sensor, wherein the first time-of-flight camera has a first field of view;
a second time-of-flight camera having a second illuminator and a second sensor, wherein the second time-of-flight camera has a second field of view, wherein the second sensor comprises a modulated light sensor and a plurality of photoreceptors, and wherein the second field of view overlaps the first field of view at least in part; and
a computer device in communication with each of the first time-of-flight camera and the second time-of-flight camera,
wherein the computer device is programmed with one or more sets of instructions that, when executed, cause the computer device to perform a method comprising:
causing the first time-of-flight camera to illuminate at least a portion of a scene within the first field of view with first light by the first illuminator at a first illumination interval within a repeated interval;
determining that at least the modulated light sensor was exposed to the first light during the first illumination interval;
in response to determining that at least the modulated light sensor was exposed to the first light during the first illumination interval,
determining a first modulation frequency of the first light;
selecting a second modulation frequency based at least in part on the first modulation frequency;
selecting a second illumination interval within the repeated interval, wherein the second illumination interval is not the first illumination interval; and
causing the second time-of-flight camera to illuminate at least the portion of the scene within the second field of view with second light by the second illuminator at a time,
wherein the time is within the second illumination interval.

2. The system of claim 1, wherein the second sensor is one of a complementary metal-oxide sensor or a charge coupled device modified to include the modulated light sensor.

3. The system of claim 1, wherein the modulated light sensor is coupled to a bandpass filter circuit comprising an operational amplifier, a filtering capacitor and a filtering resistor,
wherein at least one input to the operational amplifier is proportional to a current flowing across a photodiode in response to the first light, and
wherein the first modulation frequency is determined based at least in part on an output of the operational amplifier.

4. The system of claim 1, wherein the first time-of-flight camera is provided aboard a first vehicle, and
wherein the second time-of-flight camera is provided aboard a second vehicle.

5. A method comprising:
capturing, by a first sensor of a first imaging device, first light reflected from at least a portion of a scene within a first field of view of the first imaging device, wherein the first imaging device further comprises a first illuminator, and wherein the first sensor comprises at least one photoreceptor and a first modulated light sensor;
determining, by at least one computer processor, at least one of a first modulation frequency of the first light or a first illumination interval of the first light;
selecting, by the at least one computer processor, at least one of a second modulation frequency or a second illumination interval based at least in part on the at least one of the first modulation frequency or the first illumination interval; and
configuring the first imaging device to illuminate, by the first illuminator, the first field of view with second light, wherein configuring the first imaging device comprises at least one of:
configuring the first imaging device to illuminate, by the first illuminator, the first field of view with second light having the second modulation frequency; or
configuring the first imaging device to illuminate, by the first illuminator, the first field of view with second light at the second illumination interval.

6. The method of claim 5, wherein the first sensor comprises an array having a plurality of locations,
wherein the first modulated light sensor is in one of the plurality of locations, and
wherein the at least one photoreceptor comprises a plurality of photoreceptors distributed in locations other than the one of the locations having the first modulated light sensor.

7. The method of claim 6, wherein the first sensor comprises a plurality of modulated light sensors,
wherein the first modulated light sensor is one of the plurality of modulated light sensors, and
wherein the plurality of modulated light sensors are distributed throughout the plurality of locations of the array.

8. The method of claim 6, further comprising:
capturing at least some of the first light by each of the plurality of photoreceptors;
determining times at which the at least some of the first light is received by each of the plurality of photoreceptors;
determining, for each of the plurality of photoreceptors, a difference between the second time and a time at which the at least some of the first light is received by a corresponding one of the plurality of photoreceptors; and
generating a depth image based at least in part on the differences determined for each of the plurality of photoreceptors.

9. The method of claim 6, wherein the first sensor is one of a complementary metal-oxide sensor or a charge coupled device modified to remove a photoreceptor from the one of the plurality of locations and to include the first modulated light sensor in the one of the plurality of locations.

10. The method of claim 5, wherein the first modulated light sensor comprises a lens assembly for mapping an area of sensitivity of the first modulated light sensor or one or more photodiodes of the first modulated light sensor to the first field of view.

11. The method of claim 10, wherein the first modulated light sensor further comprises a circuit comprising an operational amplifier, a filtering capacitor and a filtering resistor, and
wherein the first modulation frequency is determined based at least in part on an output of the operational amplifier.

12. The method of claim 5, wherein the first imaging device and the at least one computer processor are provided aboard a first vehicle.

13. The method of claim 12, further comprising:
determining, based at least in part on the at least one of the first modulation frequency or the first illumination interval, that a second imaging device provided aboard a second vehicle illuminated at least the portion of the scene with the first light during the first illumination interval,
wherein the at least one of the first modulation frequency or the first illumination interval is determined in response to determining that the second imaging device provided aboard the second vehicle illuminated at least the portion of the scene with the first light during the first illumination interval.

14. The method of claim 5, wherein a first wavelength of the first light is within a range of approximately seven hundred nanometers to one thousand nanometers.

15. The method of claim 5, wherein selecting the at least one of the second modulation frequency or the second illumination interval comprises:
programming the first imaging device with a data record defining the repeated interval and a plurality of slots within the repeated interval, wherein the first imaging device is programmed prior to the first time, and wherein the first illumination interval is a first one of the plurality of slots; and
selecting a second one of the slots, wherein the second one of the slots comprises the second illumination interval, wherein the second one of the slots is not the first one of the slots.

16. A first vehicle comprising:
a first time-of-flight camera, wherein the first time-of-flight camera comprises a first illuminator and a first sensor comprising a first modulated light sensor and a plurality of photoreceptors; and
a first computer device comprising at least one processor,
wherein the first time-of-flight camera defines a first field of view, and
wherein the first computer device is configured to execute a method comprising:
capturing, by at least the first modulated light sensor, first light at a first time;
determining a first modulation frequency of at least a portion of the first light;
determining a first illumination interval of the portion of the first light;
selecting a second modulation frequency based at least in part on the first modulation frequency;
selecting a time for illuminating the first field of view by the first illuminator based at least in part on the first illumination interval, wherein the time is within a second illumination interval, and wherein each of the first illumination interval and the second illumination interval is within a repeated interval; and
causing the first illuminator to illuminate the first field of view with second light at the time,
wherein the second light has the second modulation frequency.

17. The first vehicle of claim 16, further comprising an amplifier circuit,
wherein the first modulated light sensor is coupled to an input to the circuit, and
wherein the first modulation frequency is determined based at least in part on an output from the circuit.

18. The first vehicle of claim 16, wherein the method further comprises:
identifying a data record including a plurality of time slots of the repeated interval; and
determining that the first illumination interval corresponds to a first one of the plurality of time slots,
wherein selecting the time for illuminating the first field of view by the first illuminator comprises:
selecting a second one of the plurality of time slots,
wherein the second one of the plurality of time slots is not the first one of the plurality of time slots, and
wherein the time is within the second one of the plurality of time slots.

19. The first vehicle of claim 16, wherein the first vehicle is one of an aerial vehicle, an autonomous ground vehicle or an autonomous mobile robot.

20. The first vehicle of claim 16, further comprising:
capturing, by each of the plurality of photoreceptors, at least some of the second light reflected from a scene;
determining times at which each of the plurality of photoreceptors captured the at least some of the second light; and
generating a depth image of the scene based at least in part on differences between the time and each of the times at which each of the plurality of photoreceptors captured the at least some of the second light.

* * * * *